(12) United States Patent
Koshti

(10) Patent No.: US 11,946,883 B1
(45) Date of Patent: Apr. 2, 2024

(54) SYSTEM AND METHOD FOR CRACK DETECTION

(71) Applicant: United States of America as represented by the Administrator of NASA, Washington, DC (US)

(72) Inventor: Ajay M Koshti, League City, TX (US)

(73) Assignee: United States as represented by the Administrator of NASA, Washington, DC (US)

( * ) Notice: Subject to any disclaimer, the term of this patent is extended or adjusted under 35 U.S.C. 154(b) by 379 days.

(21) Appl. No.: 17/454,865

(22) Filed: Nov. 15, 2021

Related U.S. Application Data

(60) Provisional application No. 63/159,954, filed on Mar. 11, 2021.

(51) Int. Cl.
*G01N 23/18* (2018.01)
*G01N 23/04* (2018.01)
(Continued)

(52) U.S. Cl.
CPC ............. *G01N 23/18* (2013.01); *G01N 23/04* (2013.01); *G01N 23/083* (2013.01);
(Continued)

(58) Field of Classification Search
CPC ...... G01N 23/18; G01N 23/083; G01N 23/00; G01N 23/02; G01N 2203/006;
(Continued)

(56) References Cited

U.S. PATENT DOCUMENTS 6,658,089 B1    12/2003  Mohr et al.
7,999,219 B2 *   8/2011  Skuse .................... G01N 23/04
                                                      378/207

(Continued)

OTHER PUBLICATIONS

Ajay Koshti et al., "Guide for Qualification of Nondestructive Evaluation Procedures," Engineering Directorate, Structural Engineering Division, National Aeronautics and Space Administration, Sep. 2018, pp. 1-44. (Year: 2018).*

(Continued)

*Primary Examiner* — Jeffrey P Aiello
(74) *Attorney, Agent, or Firm* — David G. Matthews; Edward K. Fein

(57) ABSTRACT

A method includes determining a predicted contrast-to-noise ratio sensitivity function (CNR SF) for crack detection of a predetermined target flaw size with the radiographic inspection system in the selected set-up. The method also includes qualifying an inspection image quality indicator (IQI) for the predetermined target flaw size for use in the radiographic inspection system in the selected set-up. The method also includes performing an inspection process. The inspection process includes selecting the qualified inspection IQI for the predetermined target flaw size. The inspection process also includes performing an inspection test on the qualified inspection IQI using the radiographic inspection system in the selected set-up. The inspection process also includes determining one or more inspection output parameters. The inspection process also includes verifying that the one or more inspection output parameters meet or exceed minimum qualified values to qualify the radiographic inspection system in the selected set-up.

20 Claims, 20 Drawing Sheets

(51) Int. Cl.
    *G01N 23/083*    (2018.01)
    *G06T 7/00*    (2017.01)

(52) U.S. Cl.
    CPC .... *G06T 7/0004* (2013.01); *G01N 2223/1016* (2013.01); *G01N 2223/3035* (2013.01); *G01N 2223/3037* (2013.01); *G01N 2223/305* (2013.01); *G01N 2223/401* (2013.01); *G01N 2223/415* (2013.01); *G01N 2223/42* (2013.01); *G01N 2223/426* (2013.01); *G01N 2223/629* (2013.01); *G01N 2223/6466* (2013.01); *G06T 2207/30136* (2013.01); *G06T 2207/30168* (2013.01)

(58) Field of Classification Search
    CPC ... G01N 2203/0062; G01N 2291/2694; G01N 2291/0258; G01N 2291/0289; G01N 2291/2672; G01N 2030/8804; G01N 2201/129; G01N 27/041; G01N 27/20; G01N 2223/646; G01N 30/02; G01M 5/0033; G01M 5/0016; G06T 2207/30164; G06T 7/0002; G06T 7/0004; B64F 5/60; B64F 5/00; B64F 5/40
    USPC ....... 73/623, 1.01, 49.5, 598, 600, 602, 583; 356/237.1; 378/58, 54; 700/109, 222; 702/40, 38, 35, 182, 39, 81, 185, 104, 702/183, 184, 108, 36, 127, 155; 703/1
    See application file for complete search history.

(56) References Cited

U.S. PATENT DOCUMENTS

| | | | | |
|---|---|---|---|---|
| 8,577,120 | B1* | 11/2013 | Koshti | G06T 7/62 |
| | | | | 250/341.8 |
| 9,720,114 | B2* | 8/2017 | Blagojevic | G01V 5/20 |
| 9,787,913 | B1* | 10/2017 | Koshti | G01J 5/0003 |
| 10,545,100 | B2* | 1/2020 | Buijsse | H01J 37/28 |
| 10,620,133 | B1* | 4/2020 | Koshti | G06T 7/174 |
| 2004/0066188 | A1* | 4/2004 | Goldfine | G01N 27/20 |
| | | | | 324/228 |
| 2020/0232938 | A1* | 7/2020 | Fitzgerald | G06T 7/0004 |

OTHER PUBLICATIONS

Muzibur Khan et al., "Computer Radiography for High Resolution Imaging Applications of Aircraft Structures", NDT In Aerospace 11th International Symposium.

"Nondestructive Evaluation Requirements for Fracture-Critical Metallic Components", NASA-STD-5009B.

Ajay Koshti, "Simulating the x-ray image contrast to setup tehniques with desired flaw detectability", Proceedings of SPIE vol. 9437.

Ajay Koshti, "X-ray ray tracing simulation and flaw parameters for crack detection", Proceedings of SPIE vol. 10600.

Ajay Koshti, "Assessing Visual and System Flaw Detectability in Nondestructive Evaluation", Proceedings of SPIE vol. 11592, Mar. 2021.

"90/95 POD Radiography Concern for COPVs and Metal Tank Welds", NESC Technical Bulletin No. 19-02.

Ajay Koshti, "Probability of Detection Analysis in Multi-Hit Flaw Detection", SPIE.

Elshafiey, "Optimization Tool for X-ray Radiography NDE", Review of Progress in Quantitative Nondestructive Evaluation, vol. 15, 1996.

Ajay Koshti, "Using requirements on merit ratios for assessing reliability of NDE flaw detection", Proceedings of SPIE vol. 11593, Mar. 2021.

Ajay Koshti, "Using requirements on merit ratios for assessing reliability of NDE flaw detection in multi-hit detection In digital radiography", Proceedings of SPIE 11593, Mar. 2021.

Ajay Koshti, "Assessment of flaw detectability using transfer function", Proceedings of SPIE vol. 11592, Mar. 2021.

Ajay Koshti, "Optimizing raster scanning parameters in nondestructive evaluation using simulation of probe sensitivity field", Proceedings of SPIE vol. 11592, Mar. 2021.

Ajay Koshti, "Modeling reliability of NDE method providing C-scan: a case of flaw field simulation", Proceedings of SPIE vol. 11593, Mar. 2021.

Ewert et al., "Minimum Requirements for Digital Radiography Equipment and Measurement Procedures by Different Industries and Standard Organizations".

Muzibur Khan, "Equivalent Penetrameter Sensitivity (EPS) for Performance Evaluation of Computed Radiography Systems".

Ajay Koshti, "Modeling the x-ray process and x-ray flaw size parameter for POD studies", Proceedings of SPIE vol. 9063, Mar. 2014.

Ajay Koshti, "Nondestructive Characterization for Composite Materials, Aerospace Engineering, Civil Infrastructure, and Homeland Security 2014", Proceedings of SPIE vol. 9063.

\* cited by examiner

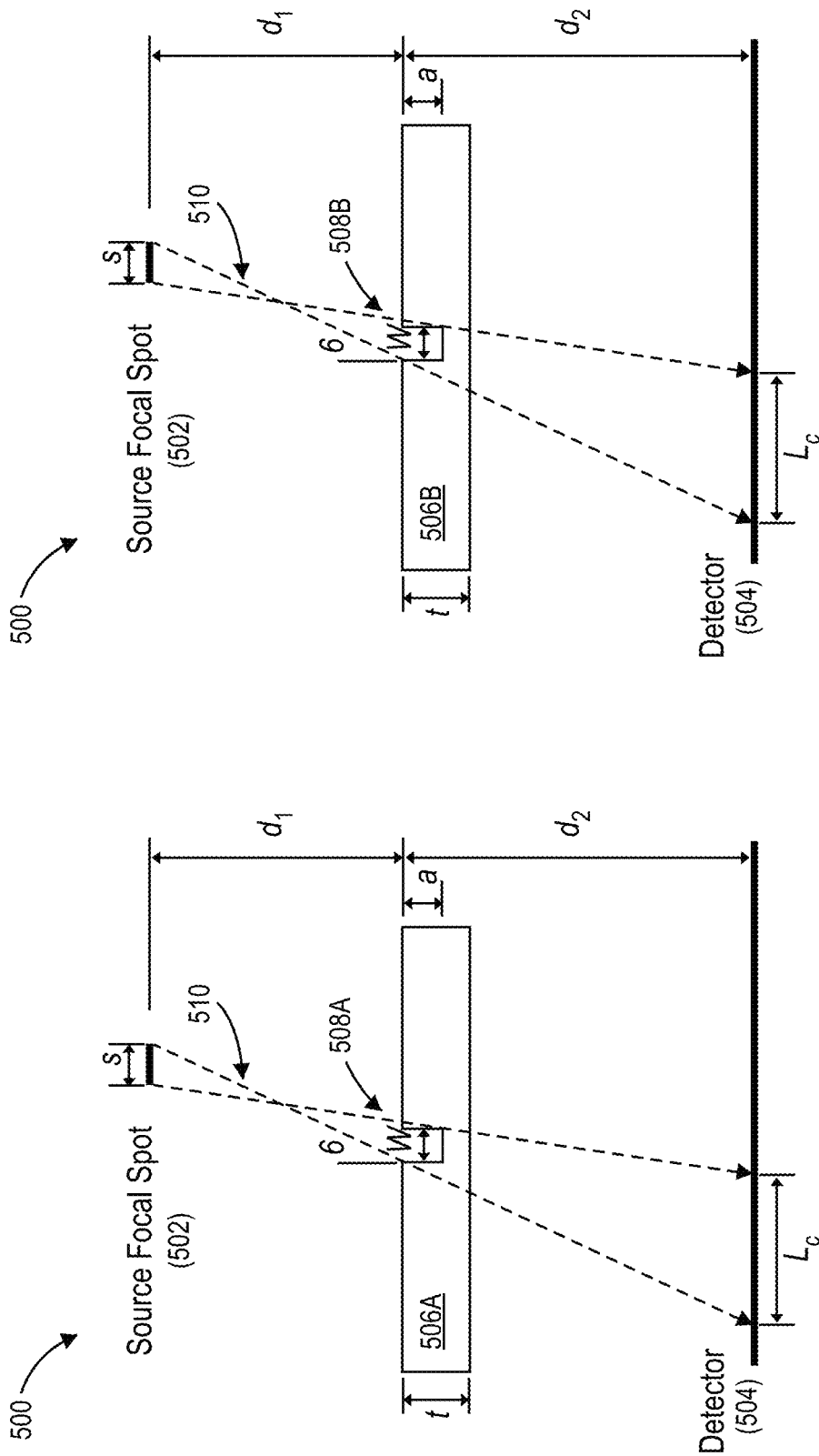

|  | CNR | Aspect Ratio | Resolution Ratio |
|---|---|---|---|
| Simulated Crack | ↕ | ↕ | ↕ |
| Simulated Cracklike Calibration Flaw | | | |
| Real Crack | | | |
| IQI | | | |

FIG. 6A

|  | CNR | Aspect Ratio | Resolution Ratio |
|---|---|---|---|
| Simulated Crack | ⤵ | ⤵ | ⤵ |
| Simulated Cracklike Calibration Flaw | | | |
| Real Crack | | | |
| IQI | | | |

FIG. 6B

|  | CNR | Aspect Ratio | Resolution Ratio |
|---|---|---|---|
| Simulated Crack |  |  |  |
| Simulated Cracklike Calibration Flaw |  |  |  |
| Real Crack | ↕ | ↕ | ↕ |
| IQI |  |  |  |

FIG. 6C

|  | CNR | Aspect Ratio | Resolution Ratio |
|---|---|---|---|
| Simulated Crack |  |  |  |
| Simulated Cracklike Calibration Flaw | ↪ | ↪ | ↪ |
| Real Crack |  |  |  |
| IQI |  |  |  |

FIG. 6D

SYSTEM AND METHOD FOR CRACK DETECTION

CROSS-REFERENCE TO RELATED APPLICATIONS

This patent application claims priority to U.S. Provisional Patent Application No. 63/159,954, filed on Mar. 11, 2021, the entirety of which is incorporated by reference herein.

BACKGROUND

Radiographic inspection is commonly used for detection of cracks in metallic and non-metallic parts. These parts requiring a radiographic inspection may be referred to as component parts. The radiographic inspection may include X-ray inspection to detect cracks in a component part. The component parts to be inspected may include aircraft fuselage, aircraft wings, fuel tanks, boilers, fan blades, combustor cases, and other metal parts. The radiographic inspection of the component parts may include inspections of welds on the component parts to detect cracks. Radiographic inspection of component parts is performed to provide reliable detection of a certain minimum size of cracks or similar cracklike flaws. These cracks and cracklike flaws having at least a minimum sized flaw may be referred to as target-sized flaws.

A radiographic inspection of a part may be performed using a selected radiographic inspection technique. An inspection technique includes a test set-up and has inspection requirements that may describe the inspection set-up. An inspection technique performed in accordance with the selected inspection technique may need to be performed on a sample part with real cracks to validate that the inspection technique can detect target-sized flaws in a component part at an acceptable quality level. Performance of an inspection technique on a sample part with real cracks may not be practical for each component part due to the substantial time and costs for manufacturing the sample part and performing the inspection technique on the sample part.

There is a need for a practical and improved inspection system and method that validates an inspection technique configured to detect target-sized flaws in component parts.

SUMMARY

A method for qualifying a radiographic inspection system in a selected set-up to make a crack detectability determination is disclosed. The method includes performing a computer-simulated process. The computer-simulated process includes selecting a simulated crack having a target flaw size. The computer-simulated process also includes selecting a simulated crack-like flaw having a calibration flaw size. The computer-simulated process also includes performing a first simulation test on the simulated crack and a second simulation test on the simulated crack-like flaw using a simulated radiographic system in the selected set-up. The computer-simulated process also includes determining one or more simulated output parameters based upon the first and second simulation tests. The one or more simulated output parameters include one or more simulated crack output parameters and one or more simulated crack-like flaw output parameters. The computer-simulated process also includes determining a simulated contrast-to-noise ratio sensitivity function (CNR SF) based upon the one or more simulated output parameters. The computer-simulated process also includes determining one or more simulated transfer functions between the target flaw size and the calibration flaw size based on the CNR SF. The method also includes performing an empirical process. The empirical process includes selecting a real crack specimen having the target flaw size. The empirical process also includes selecting an empirical image quality indicator (IQI) including a crack-like flaw having the calibration flaw size. The empirical process also includes performing a first empirical test on the real crack specimen and a second empirical test on the empirical IQI using the radiographic inspection system in the selected set-up. The empirical process also includes determining one or more empirical output parameters based upon the first and second empirical tests. The one or more empirical output parameters include one or more real crack specimen output parameters and one or more empirical IQI output parameters. The empirical process also includes determining an empirical CNR SF based upon the one or more empirical output parameters. The empirical process also includes determining one or more empirical transfer functions between the target flaw size and the calibration flaw size based on the empirical CNR SF. The method also includes determining a plurality of correlations based upon the simulated CNR SF and the empirical CNR SF. The method also includes determining a predicted CNR SF for crack detection based upon the plurality of correlations. The method also includes selecting and qualifying an inspection IQI for a predetermined target flaw size for use in the radiographic inspection system in the selected set-up based upon the plurality of correlations and the predicted CNR SF. The method also includes determining minimum qualified values for the one or more empirical IQI output parameters for the inspection IQI to provide detection of the predetermined target flaw size. The method also includes performing an inspection process. The inspection process includes selecting the qualified inspection IQI for the predetermined target flaw size. The inspection process also includes performing an inspection test on the qualified inspection IQI using the radiographic inspection system in the selected set-up. The inspection process also includes determining one or more inspection output parameters. The inspection process also includes verifying that the one or more inspection output parameters meet or exceed the minimum qualified values to qualify the radiographic inspection system in the selected set-up. The method also includes inspecting a component part using the qualified radiographic inspection system in the selected set-up to detect one or more cracks with greater than or equal to the predetermined target flaw size.

In another embodiment, the method includes performing a computer-simulated process. The computer-simulated process includes selecting a simulated crack having a target flaw size. The computer-simulated process also includes selecting a simulated crack-like flaw having a calibration flaw size. The computer-simulated process also includes performing a first simulation test on the simulated crack and a second simulation test on the simulated crack-like flaw using a simulated radiographic system in a simulated set-up. The computer-simulated process also includes determining one or more simulated output parameters based upon the first and second simulation tests. The method also includes performing an empirical process. The empirical process includes selecting a real crack specimen having the target flaw size. The empirical process also includes selecting an empirical image quality indicator (IQI) including a crack-like flaw having the calibration flaw size. The empirical process also includes performing a first empirical test on the first real crack specimen and a second empirical test on the empirical IQI using a radiographic inspection system in a selected set-up. The empirical process also includes determining one or more empirical output parameters based upon the first and second empirical tests. The method also includes determining one or more correlations based at least partially upon the one or more simulated output parameters and the one or more empirical output parameters. The method also includes determining a predicted output parameter for crack detection based upon the one or more correlations. The method also includes selecting an inspection IQI for a predetermined target flaw size for use in the radiographic inspection system in the selected set-up based at least partially upon the predicted output parameter. The method also includes determining minimum qualified values for the inspection IQI to provide detection of the predetermined target flaw size. The method also includes performing an inspection process. The inspection process includes performing an inspection test on the inspection IQI using the radiographic inspection system in the selected set-up. The inspection process also includes determining one or more inspection output parameters based upon the inspection test. The inspection process also includes verifying that the one or more inspection output parameters meet or exceed the minimum qualified values to qualify the radiographic inspection system in the selected set-up.

In another embodiment, the method includes determining a predicted contrast-to-noise ratio sensitivity function (CNR SF) for crack detection of a predetermined target flaw size with the radiographic inspection system in the selected set-up. The method also includes qualifying an inspection image quality indicator (IQI) for the predetermined target flaw size for use in the radiographic inspection system in the selected set-up. Qualifying the inspection IQI includes determining one or more minimum qualified values for one or more IQI output parameters during an IQI inspection process to provide detection of the predetermined target flaw size. The minimum qualified values are based on the predicted CNR SF. The method also includes performing an inspection process. The inspection process includes selecting the qualified inspection IQI for the predetermined target flaw size. The inspection process includes performing an inspection test on the qualified inspection IQI using the radiographic inspection system in the selected set-up. The inspection process includes determining one or more inspection output parameters. The inspection process includes verifying that the one or more inspection output parameters meet or exceed the minimum qualified values to qualify the radiographic inspection system in the selected set-up.

BRIEF DESCRIPTION OF THE DRAWINGS

The following figures form part of the present specification and are included to further demonstrate certain aspects of the presently described subject matter and should not be used to limit it. The present subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 5A and 5B illustrate side views of a radiographic system in the selected set-up performing second (e.g., empirical) tests, according to an embodiment.

FIGS. 6A-6D illustrate charts showing correlations, according to an embodiment.

DETAILED DESCRIPTION

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art that other embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Figure 1A:
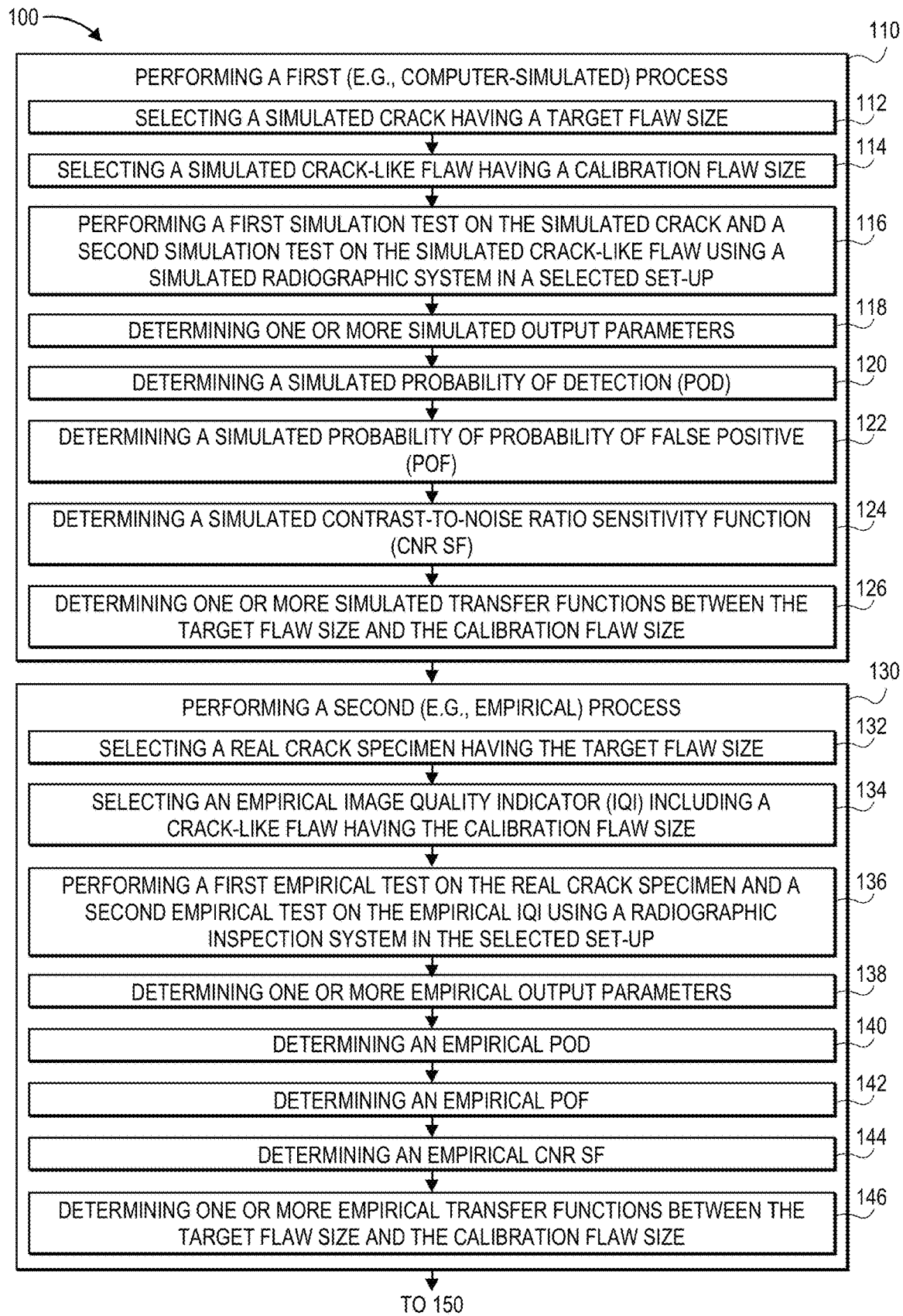
FIGS. 1A and 1B illustrate a flowchart of a method for qualifying a radiographic inspection system in a selected set-up to make a crack detectability determination, according to an embodiment.
Figure 1B:
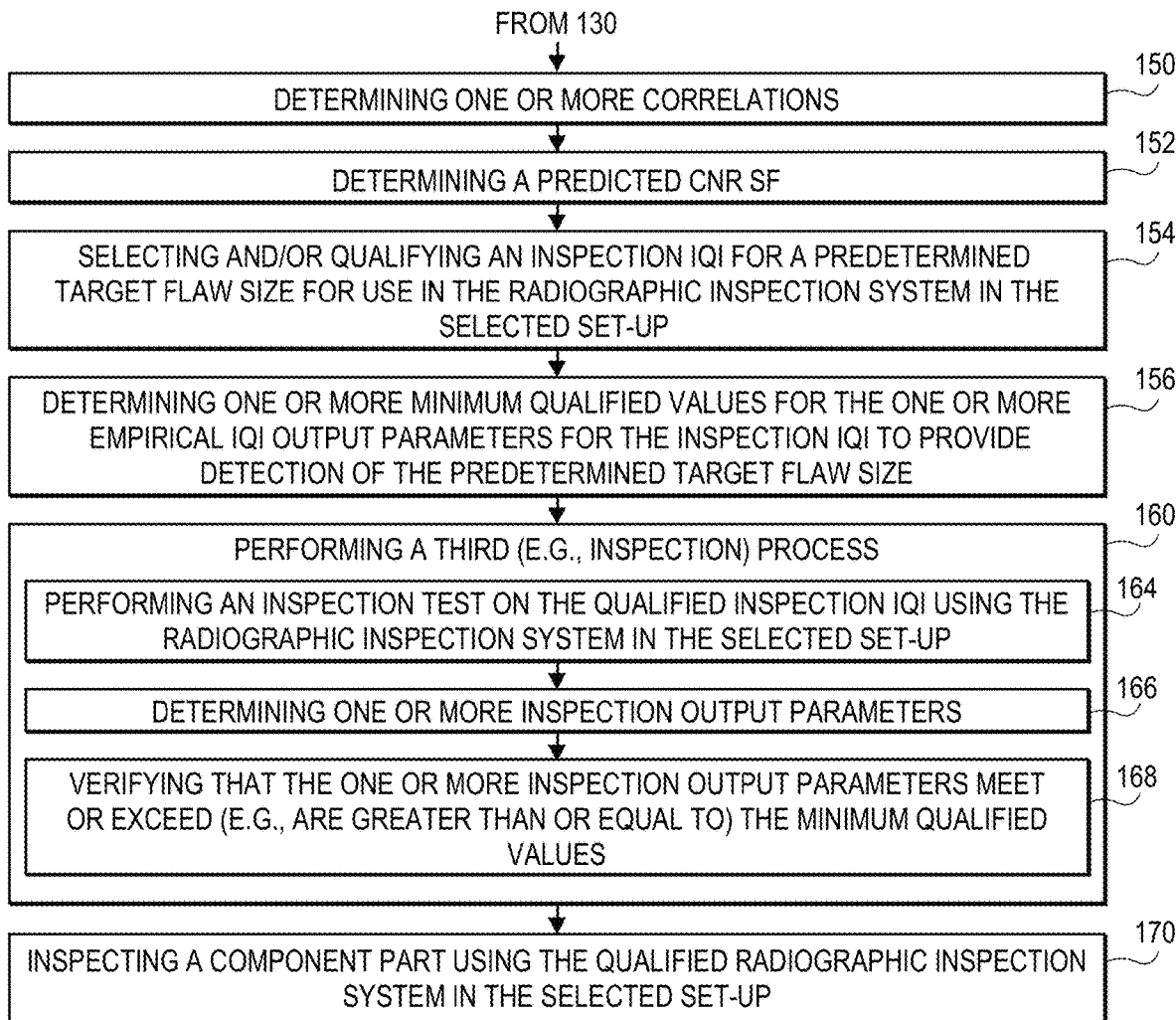

FIGS. 1A and 1B illustrate a flowchart of a method 100 for qualifying a radiographic inspection system in a selected set-up to make a crack detectability determination, according to an embodiment. An illustrative order of the method 100 is provided below; however, one or more steps of the method 100 may be performed in a different order, split into sub-steps, combined, repeated, or omitted.

The method 100 may include performing a first (e.g., computer-simulated) process, as at 110. As the name suggests, the computer-simulated process may include one or more simulations that is/are performed on a computing system.

The computer-simulated process may include selecting a simulated crack having a target flaw size, as at 112. The computer-simulated process may also include selecting a simulated crack-like flaw having a calibration flaw size, as at 114. A crack refers to a controlled fatigue-induced crack, and a crack like flaw refers to a narrow machined slot. The target flaw size refers to the smallest size of flaws that need to be detected reliably in x-ray inspection, and the calibration flaw size refers to the flaw size that will be used in a calibration reference standard which will be used for standardizing (e.g., calibrating) the x-ray technique.

Figure 2B:
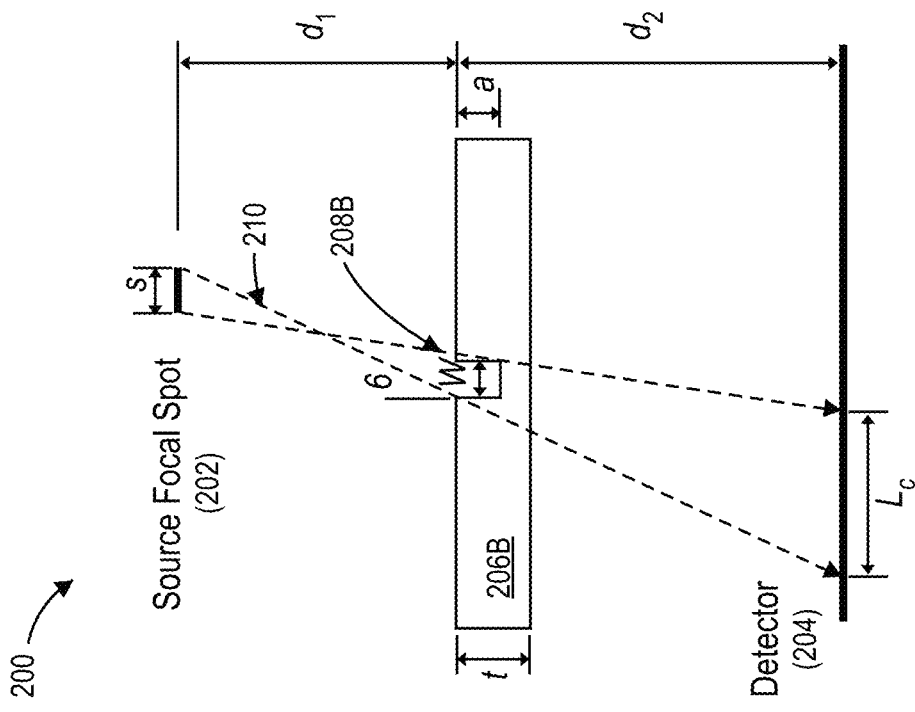
FIGS. 2A and 2B illustrate side views of a simulated radiographic system in a selected set-up performing first (e.g., simulation) tests, according to an embodiment.
Figure 2A:
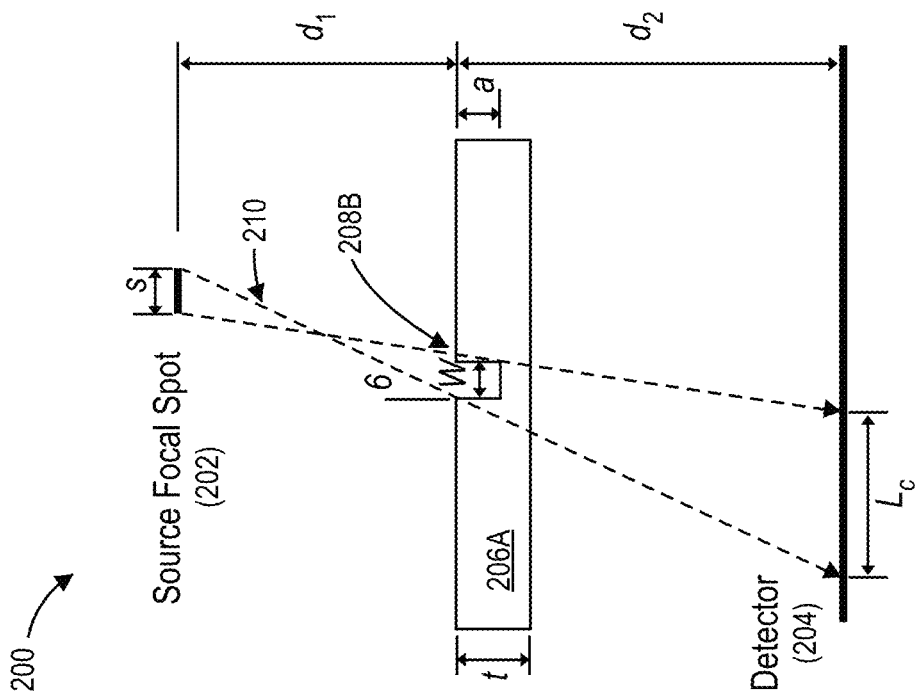

The computer-simulated process may also include performing a first simulation test on the simulated crack and a second simulation test on the simulated crack-like flaw using a simulated radiographic system in a selected set-up, as at 116. The simulation tests may be performed using the computing system. FIGS. 2A and 2B illustrate side views of a simulated radiographic system 200 in the selected set-up, according to an embodiment. The simulated radiographic system 200 may include a simulated radiation source 202 and a simulated detector (e.g., film) 204. In the selected set-up, a first simulated part 206A having the simulated crack 208A and/or a second simulated part 206B having the simulated crack like flaw 208B may be positioned between the simulated radiation source 202 and the simulated detector 204. During the simulation tests, the simulated radiation source 202 transmits simulated radiation rays 210 that pass through the simulated parts 206A, 206B to the simulated detector 204, which records a detected image. The detected image(s) may correspond to characteristics of the simulated crack 208A having the target flaw size and/or the simulated crack like flaw 208B having the calibration flaw size.

The computer-simulated process may also include determining one or more simulated output parameters, as at 118.

The simulated output parameters may be based upon the first and second simulation tests. In one embodiment, the simulated output parameters may include a simulated contrast-to-noise ratio (CNR), a simulated indication aspect ratio, a simulated resolution ratio, or a combination thereof. The CNR refers to the contrast-to-noise ratio, where the difference between the average gray value of indication pixels and the surrounding area pixels (or background) is defined as contrast, and the standard deviation of the gray value of pixels in the background is defined as noise. The indication aspect ratio refers to the ratio of the length to the width of the crack or flaw. The resolution ratio refers to the ratio of a crack or flaw linear indication width to the total (image) unsharpness (at the detector). The resolution ratio is used to address the resolution in the detection of linear indications of cracks. The term total unsharpness (e.g., at the detector) refers to gap in a duplex wire pair image that is detectable with a small fixed value (e.g., 20%) of modulation transfer function. This is equivalent to smallest width of a linear indication at the detector that is detectable.

The computer-simulated process may also include determining a simulated probability of detection (POD), as at 120. The simulated POD may be based upon the one or more simulated output parameters. The POD refers to the probability of detecting the simulated crack, the simulated crack-like flaw, or both.

The computer-simulated process may also include determining a simulated probability of false positive (POF), as at 122. The simulated POF may be based upon the one or more simulated output parameters. The POF refers to the probability of a flaw detection call where there is no flaw (i.e., a false positive).

The computer-simulated process may also include determining a simulated contrast-to-noise ratio sensitivity function (CNR SF), as at 124. The simulated CNR SF may be based upon the one or more simulated output parameters, the simulated POD, the simulated POF, or a combination thereof. The CNR SF refers to a (e.g., lower) limit on the CNR as a function of the resolution ratio and/or the indication aspect ratio (e.g., length/width).

Figure 3A:
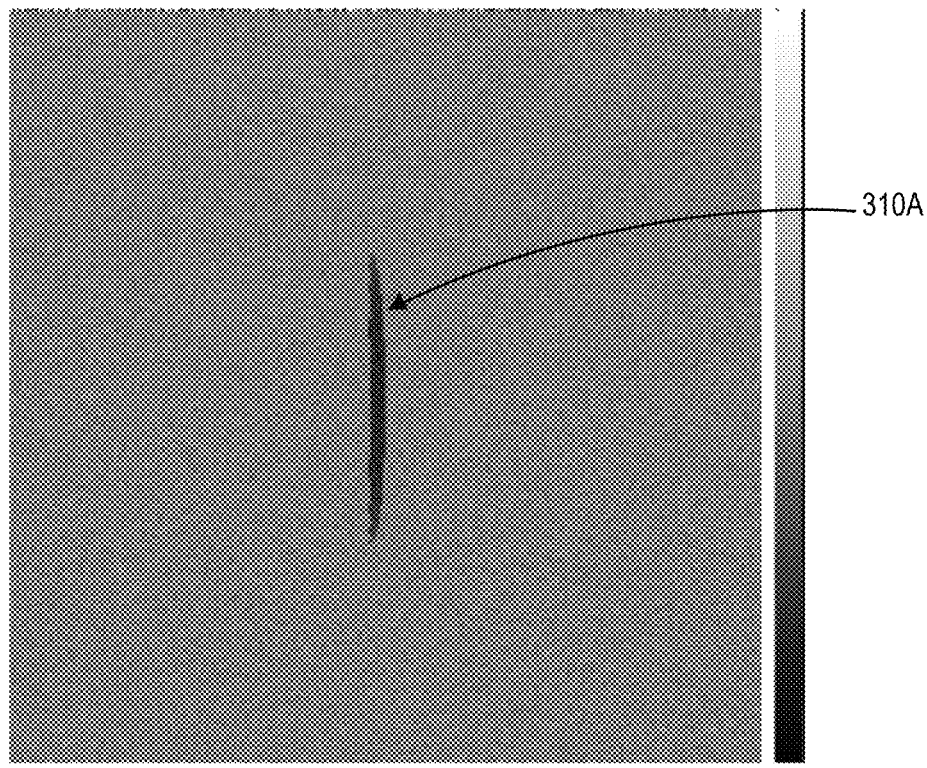
FIGS. 3A-3D illustrate images from an extended 2D model simulation, according to an embodiment.
Figure 3B:
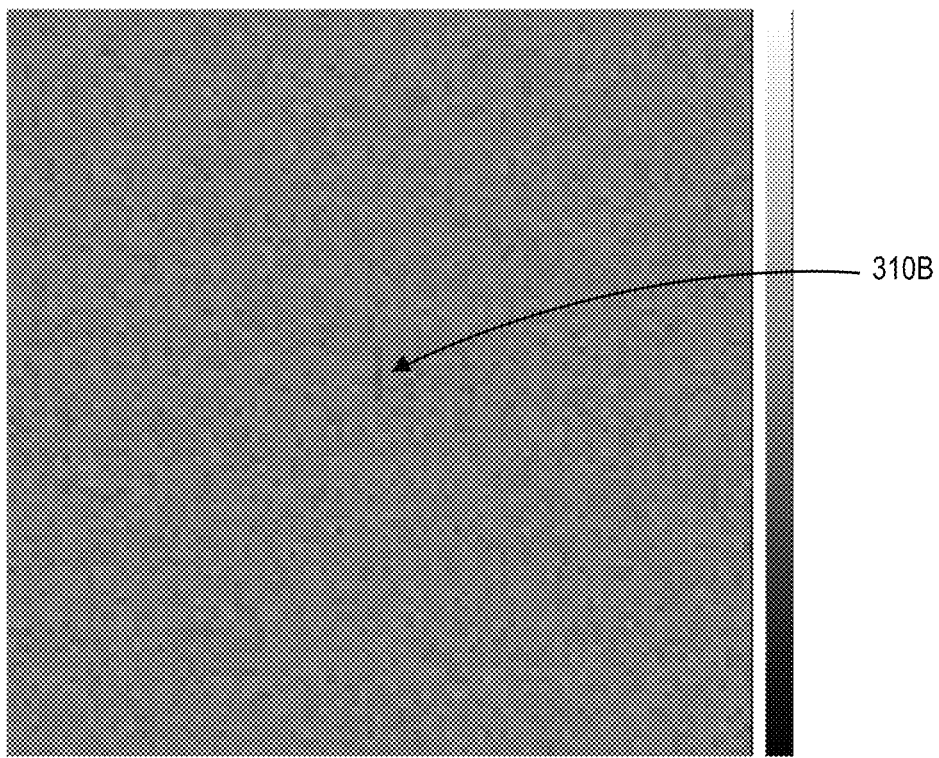

FIGS. 3A and 3B illustrate two images from an extended 2D model simulation, according to an embodiment. The images provide the CNR and resolution ratios (e.g., $R_{r1}$, $R_{r2}$, $R_{r3}$, and $R_{b,n}$). The indication 310A in FIG. 3A has a higher x-ray angle, higher contrast, and higher resolution ratios compared to the indication 310B in FIG. 3B. The indication 310B is narrower than the indication 310A. Both indications 310A, 310B are detectable, but the indication 310A may be detected more reliably. The $R_{b,n}$ value does not account for angle and is higher in the image in FIG. 3A.

In an example, the image in FIG. 3A includes:
Film
Single wall
Angle=6 degrees
Slot width=0.0050 mm
Slot length=1.750 mm
Total unsharpness=0.0226 mm
Contrast sensitivity=1.00%
Normalized resolution ratio=22.147
Pixel pitch=0.0100 mm
Total unsharpness at detector/pitch=2.276
Picture length=20.00 mm
Half max CNR=6.77
Number of pixels above 50% peak=1281
Number of pixels in width=9
Number of pixels in length=173
Indication length/width=19.22

Crack geometric indication width to total unsharpness at detector ration 1=5.91
Crack indication width to total unsharpness at detector ratio 2=6.74
Crack image half max width to total unsharpness at detector ratio 3=3.95
POD=100.00%
POF=0.00%
Number of POD calculations=30
In an example, the image in FIG. 3B includes:
Film
Single wall
Angle=6 degrees
Slot width=0.0050 mm
Slot length=0.994 mm
Total unsharpness=0.0236 mm
Contrast sensitivity=0.50%
Normalized resolution ratio=4.473
Pixel pitch=0.1000 mm
Total unsharpness at detector/pitch=2.254
Picture length=200.00 mm
Half max CNR=2.62
Number of pixels above 50% peak=7
Number of pixels in width=1
Number of pixels in length=7
Indication length/width=7.00
Crack geometric indication width to total unsharpness at detector ration 1=0.34
Crack indication width to total unsharpness at detector ratio 2=3.07
Crack image half max width to total unsharpness at detector ratio 3=0.44
POD=99.89%
POF=0.11%
Number of POD calculations=7

Figure 3C:
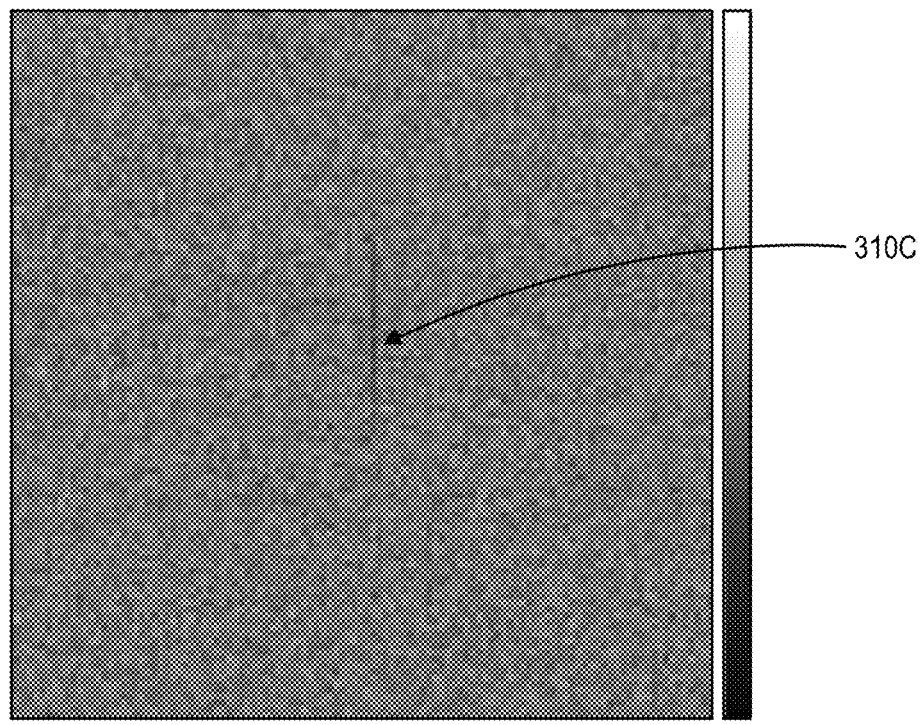
Figure 3D:
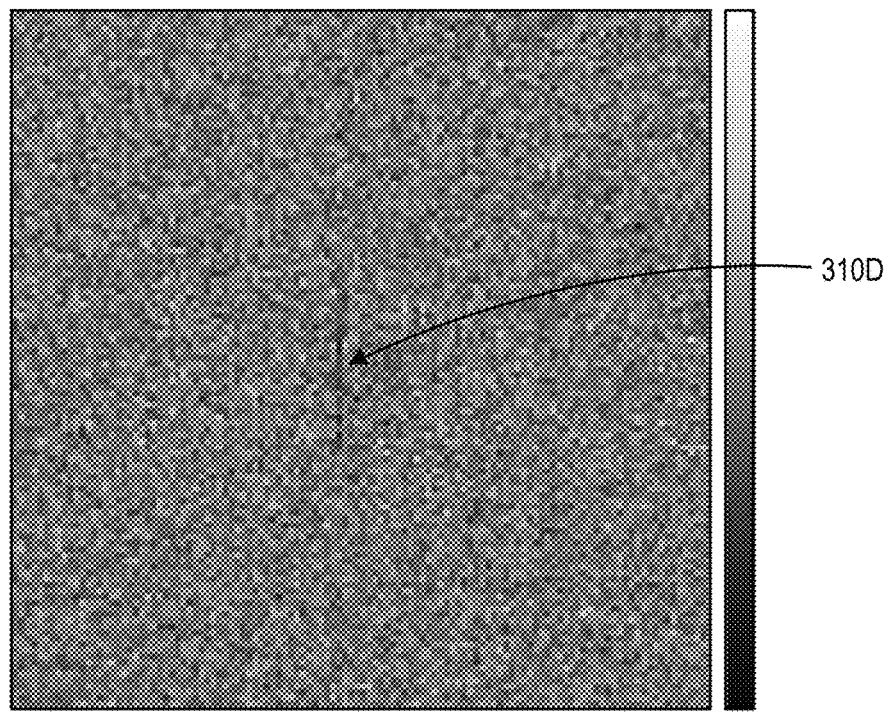

FIGS. 3C and 3D illustrate two more images from an extended 2D model simulation, according to an embodiment. The images provide the CNR and resolution ratios (e.g., $R_{r1}$, $R_{r2}$, $R_{r3}$, and $R_{b,n}$). The indication 310C in FIG. 3C has a contrast sensitivity of 1%, and the indication 310D in FIG. 3D has a contrast sensitivity of 2%. The rest of the inputs are the same. Contrast sensitivity defines noise level and affects CNR directly. As may be seen, the indication 310D is fainter while the indication 310C may be more easily detectable.

In an example, the image in FIG. 3C includes:
Film
Single wall
Angle=6 degrees
Slot width=0.0050 mm
Slot length=1.750 mm
Total unsharpness=0.1169 mm
Contrast sensitivity=1.00%
Normalized resolution ratio=4.277
Pixel pitch=0.0500 mm
Total unsharpness at detector/pitch=2.358
Picture length=100.00 mm
Half max CNR=2.54
Number of pixels above 50% peak=31
Number of pixels in width=1
Number of pixels in length=33
Indication length/width=33
Crack geometric indication width to total unsharpness at detector ration 1=1.15
Crack indication width to total unsharpness at detector ratio 2=3.14
Crack image half max width to total unsharpness at detector ratio 3=0.42
POD=100.00%
POF=0.00%
Number of POD calculations=30
In an example, the image in FIG. 3D includes:
Film
Single wall
Angle=0.0 degrees
Slot width=0.0050 mm
Slot length=1.750 mm
Total unsharpness=0.1169 mm
Contrast sensitivity=2.00%
Normalized resolution ratio=2.139
Pixel pitch=0.0500 mm
Total unsharpness at detector/pitch=2.358
Picture length=100.00 mm
Half max CNR=1.50
Number of pixels above 50% peak=22
Number of pixels in width=1
Number of pixels in length=33
Indication length/width=33
Crack geometric indication width to total unsharpness at detector ration 1=0.05
Crack indication width to total unsharpness at detector ratio 2=2.08
Crack image half max width to total unsharpness at detector ratio 3=0.42
POD=100.00%
POF=0.00%
Number of POD calculations=30

Figure 4A:
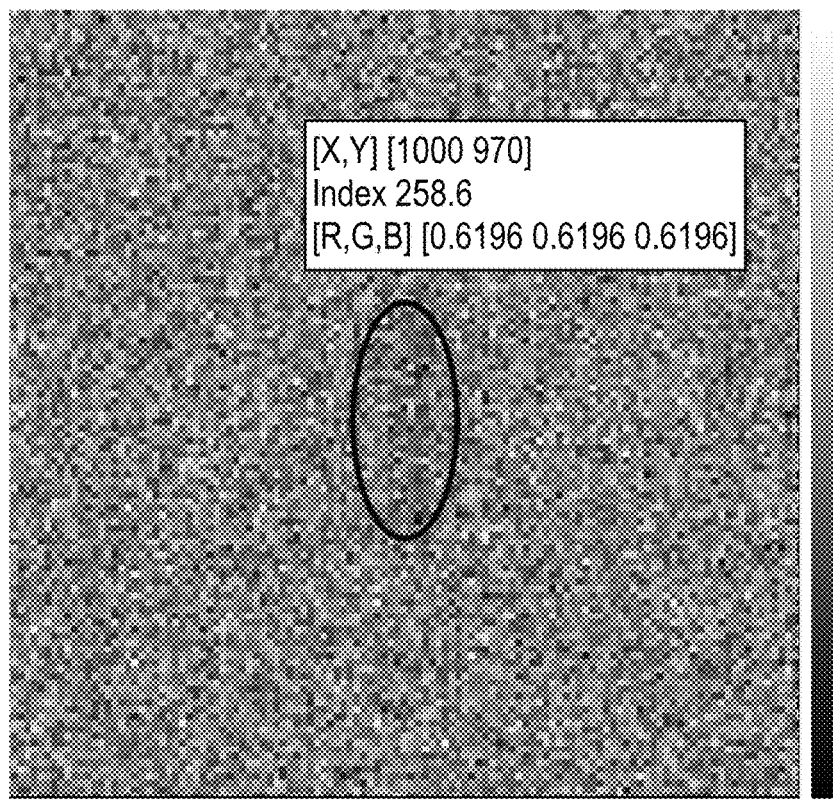
FIGS. 4A and 4B illustrate simulated indication images for which CNRs, resolution ratios, length/width ratios, PODs, and POFs are calculated for a selected set-up and x-ray angle, according to an embodiment.
Figure 4B:
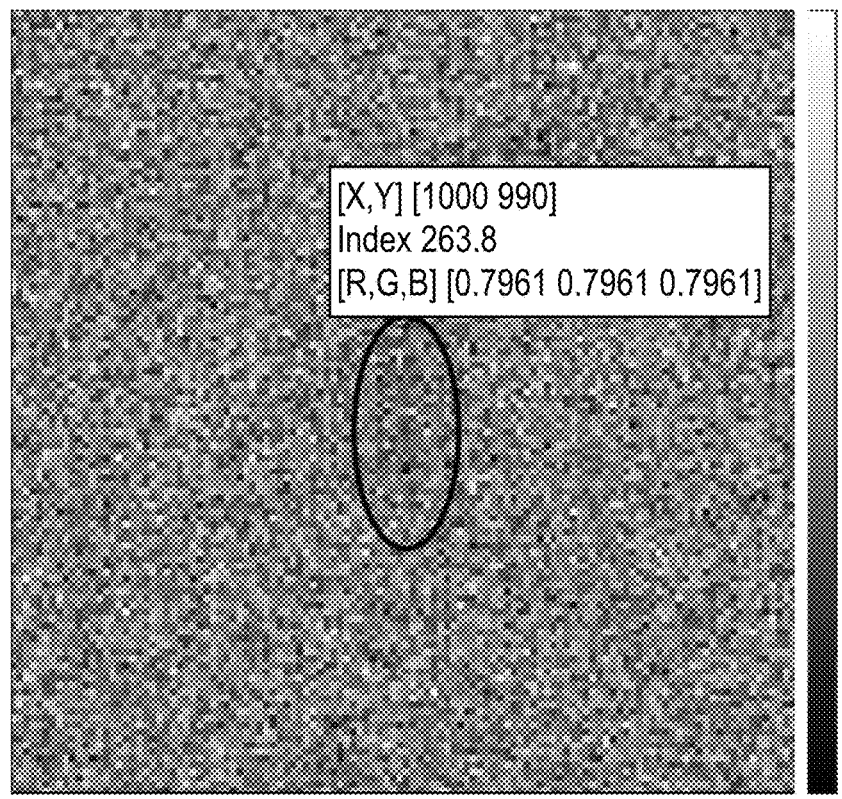

FIGS. 4A and 4B illustrate two images showing simulated CNRs and resolution ratio maps as a function of slot width and x-ray angle, according to an embodiment. The two images are for the same set-up but have a different x-ray angle. FIG. 4A shows a high POD for a low CNR. FIG. 4B shows a low POD and lower CNR. As the x-ray angle increases from 4 degrees in FIG. 4A to 5 degrees in FIG. 4B, the flaw detectability transitions from being detectable to undetectable for the simulation. The transition from detectable to undetectable provides a data point on the CNR SF surface. The CNR SF surface can be correlated to the actual CNR SF based at least partially upon empirical data. Such correlation can be referred to as a transfer function for CNR SF. The differences between the two CNR SFs may be due to differences in crack morphology of real flaws versus those used in simulation.

In an example, the image in FIG. 4A includes:
Film
Single wall
Angle=4.0 degrees
Slot width=0.0020 mm
Slot length=0.994 mm
Total unsharpness=0.0197 mm
Contrast sensitivity=3.00%
Normalized resolution ratio=3.379
Pixel pitch=0.0250 mm
Total unsharpness at detector/pitch=2.367
Picture length=50.00 mm
Half max CNR=0.63
Number of pixels above 50% peak=165
Number of pixels in width=7
Number of pixels in length=37
Indication length/width=5.29
Crack geometric indication width to total unsharpness at detector ration 1=2.63

Crack indication width to total unsharpness at detector ratio 2=3.95
Crack image half max width to total unsharpness at detector ratio 3=2.96
POD=100.00%
POF=0.00%
Number of POD calculations=30
In an example, the image in FIG. 4B includes:
Film
Single wall
Angle=5.0 degrees
Slot width=0.0020 mm
Slot length=0.994 mm
Total unsharpness=0.0197 mm
Contrast sensitivity=3.00%
Normalized resolution ratio=3.379
Pixel pitch=0.0250 mm
Total unsharpness at detector/pitch=2.367
Picture length=50.00 mm
Half max CNR=0.60
Number of pixels above 50% peak=181
Number of pixels in width=7
Number of pixels in length=37
Indication length/width=5.29
Crack geometric indication width to total unsharpness at detector ration 1=3.26
Crack indication width to total unsharpness at detector ratio 2=4.40
Crack image half max width to total unsharpness at detector ratio 3=2.96
POD=0.00%
POF=100.00%
Number of POD calculations=30

Referring back to the flowchart 100 in FIG. 1, the computer-simulated process may also include determining one or more simulated transfer functions between the target flaw size and the calibration flaw size, as at 126. The simulated transfer functions may be based on the simulated CNR SF. The simulated transfer functions refer to a correlation between the CNR SF for the simulated crack having the target flaw size and the simulated crack-like flaw having the calibration flaw size.

The method 100 may also include performing a second (e.g., empirical) process, as at 130. The empirical process may be performed before, simultaneously with, or after the computer-simulated process.

The empirical process may include selecting a real crack specimen having the target flaw size, as at 132. The empirical process may also include selecting an empirical image quality indicator (IQI) including a crack-like flaw having the calibration flaw size, as at 134. The real crack specimen refers to a fatigue-induced crack with known length, depth, and crack opening in a specimen. The empirical IQI refers to a physical device containing a fabricated (e.g., electro discharge machined) notch with known length, depth, and opening, where the device is intended for use in actual x-ray inspection of the part.

The empirical process may also include performing a first empirical test on the real crack specimen and a second empirical test on the empirical IQI using a radiographic inspection system in the selected set-up, as at 136. FIGS. 5A and 5B illustrates side views of a radiographic system 500 in the selected set-up, according to an embodiment. The radiographic system 500 may include a radiation source (i.e., actual, not simulated) 502 and a detector 504 (i.e., actual, not simulated). In the selected set-up, the real crack specimen 506A and/or the empirical IQI 506B may be positioned between the radiation source 502 and the detector 504. During the empirical tests, the radiation source 502 transmits radiation rays 510 that pass through the real crack specimen 506A and the empirical IQI 506B to the detector 504, which records a detected image. The detected image(s) may correspond to characteristics of the real crack specimen 508A having the target flaw size and/or the empirical IQI 506B including the crack-like flaw 508B having the calibration flaw size.

The empirical process may also include determining one or more empirical output parameters, as at 138. The empirical output parameters may be based upon the first and second empirical tests. In one embodiment, the empirical output parameters may include an empirical CNR, an empirical indication aspect ratio, an empirical resolution ratio, or a combination thereof. In another embodiment, the empirical output parameters may include one or more real crack specimen output parameters and one or more empirical IQI output parameters.

The empirical process may also include determining an empirical POD, as at 140. The empirical POD may be based upon the one or more empirical output parameters.

The empirical process may also include determining an empirical POF, as at 142. The empirical POF may be based upon the one or more empirical output parameters.

The empirical process may also include determining an empirical CNR SF, as at 144. The empirical CNR SF may be based upon the one or more empirical output parameters, the empirical POD, the empirical POF, or a combination thereof.

The empirical process may also include determining one or more empirical transfer functions between the target flaw size and the calibration flaw size, as at 146. The empirical transfer functions may be based on the empirical CNR SF. The empirical transfer functions refer to one or more correlations between the CNR SF for the real crack specimen having the target flaw size and the crack-like flaw having the calibration flaw size.

The method 100 may also include determining one or more correlations, as at 150. The correlations may be based upon the simulated CNR SF and the empirical CNR SF. FIGS. 6A-6D illustrates charts of the correlations, according to an embodiment. Thus, in one embodiment, the correlations may include one or more first correlations between the simulated crack and the simulated crack-like flaw, one or more second correlations between the real crack specimen and the empirical IQI, one or more third correlations between the simulated crack and the real crack specimen, one or more fourth correlations between the simulated crack-like flaw and the empirical IQI, or a combination thereof. In another embodiment, the correlations may include a first set of correlations between a CNR of the simulated crack and a CNR of the simulated crack-like flaw, an aspect ratio of the simulated crack and an aspect ratio of the simulated crack-like flaw, and a resolution ratio of the simulated crack and a resolution ratio of the simulated crack-like flaw. The correlations may also include a second set of correlations between a CNR of the real crack specimen and a CNR of the empirical IQI, an aspect ratio of the real crack specimen and an aspect ratio of the empirical IQI, and a resolution ratio of the real crack specimen and a resolution ratio of the empirical IQI. The correlations may also include a third set of correlations between the CNR of the simulated crack and the CNR of the real crack specimen, the aspect ratio of the simulated crack and the aspect ratio of the real crack specimen, and the resolution ratio of the simulated crack and the resolution ratio of the real crack specimen. The correlations may also include a fourth set of correlations between the CNR of the simulated crack-like flaw and the CNR of the empirical IQI, the aspect ratio of the simulated crack-like flaw and the aspect ratio of the empirical IQI, and the resolution ratio of the simulated crack-like flaw and the resolution ratio of the empirical IQI.

The method 100 may also include determining or predicting a predicted CNR SF, as at 152. The predicted CNR SF may be used for crack detection. The predicted CNR SF may be based upon the plurality of correlations.

The method 100 may also include selecting and/or qualifying an inspection IQI for a predetermined target flaw size for use in the radiographic inspection system in the selected set-up, as at 154. The inspection IQI refers to a device with a target size real crack or a selected size artificial crack with known dimensions and controlled morphology. It may be made using a controlled fatigue crack growth process, electro-discharge machining process, laser machining process, or any other process that yields the desired morphology flaw. The width of the IQI flaw may be the same or larger than that of the target crack to be detected. The inspection IQI may be selected and/or qualified based upon the correlations, the predicted CNR SF, or both. The predetermined target flaw size may be the same as or different than the target flaw size from step 112 above.

The method 100 may also include determining one or more minimum qualified values for the one or more empirical IQI output parameters for the inspection IQI to provide detection of the predetermined target flaw size, as at 156.

The method 100 may also include performing a third (e.g., inspection) process, as at 160. The inspection process may be performed before, simultaneously with, or after the computer-simulated process, the empirical process, or both.

Figure 7:
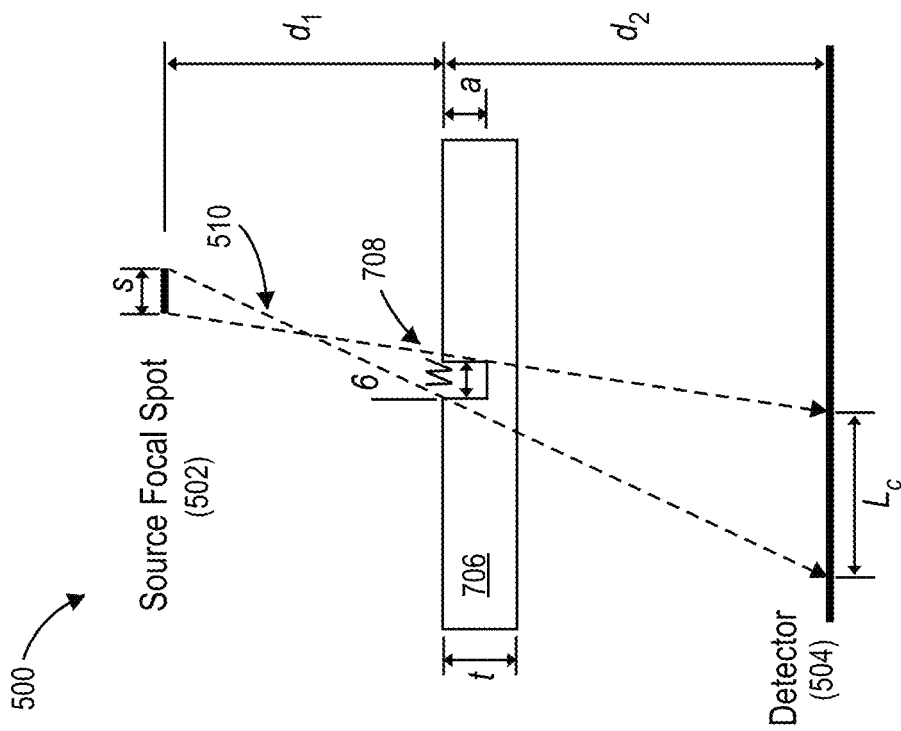
FIG. 7 illustrates a side view of the radiographic system in the selected set-up performing third (e.g., inspection) tests, according to an embodiment.

The inspection process may include selecting the qualified inspection IQI for the predetermined target flaw size, as at 162. The inspection process may also include performing an inspection test on the qualified inspection IQI using the radiographic inspection system 500 in the selected set-up, as at 164. FIG. 7 illustrates a side view of the radiographic system 500 in the selected set-up, according to an embodiment. In the selected set-up, the qualified inspection IQI 706 may be positioned between the radiation source 502 and the detector 504. During the inspection test(s), the radiation source 502 transmits radiation rays 510 that pass through the qualified inspection IQI 706 to the detector 504, which records a detected image. The detected image(s) may correspond to characteristics of the qualified inspection IQI 706 and any cracks or flaws 708 therein.

Referring to FIGS. 2A, 2B, 5A, 5B, and 7, in the selected set-up, one or more of the following input parameters may be the same:

the thickness t of the part 206, 208, 506, 508, 706;
the distance d1 between the source 202, 502 and the part 206A, 206B, 506A, 506B, 706;
the distance d2 between the part 206A, 206B, 506A, 506B, 706 and the detector 204, 504;
the single wall (shown) or double wall (not shown) geometry;
the depth a of the simulated crack 208A, the simulated crack like flaw 208B, the real crack specimen 508A, the crack-like flaw 508B, and the crack/flaw 708;
the width w of the simulated crack 208A, the simulated crack like flaw 208B, the real crack specimen 508A, the crack-like flaw 508B, and the crack/flaw 708;
the x-ray angle β with the crack plane; and/or
the focal spot size s of the source 202, 502;

The inspection process may also include determining one or more inspection output parameters, as at 166. The inspection output parameters may be based upon the inspection test(s). In one embodiment, the inspection output parameters may include an inspection CNR, an inspection indication aspect ratio, an inspection resolution ratio, or a combination thereof.

The inspection process may also include verifying that the one or more inspection output parameters meet or exceed (e.g., are greater than or equal to) the minimum qualified values, as at 168. This may qualify the radiographic inspection system 500 in the selected set-up.

Figure 8:
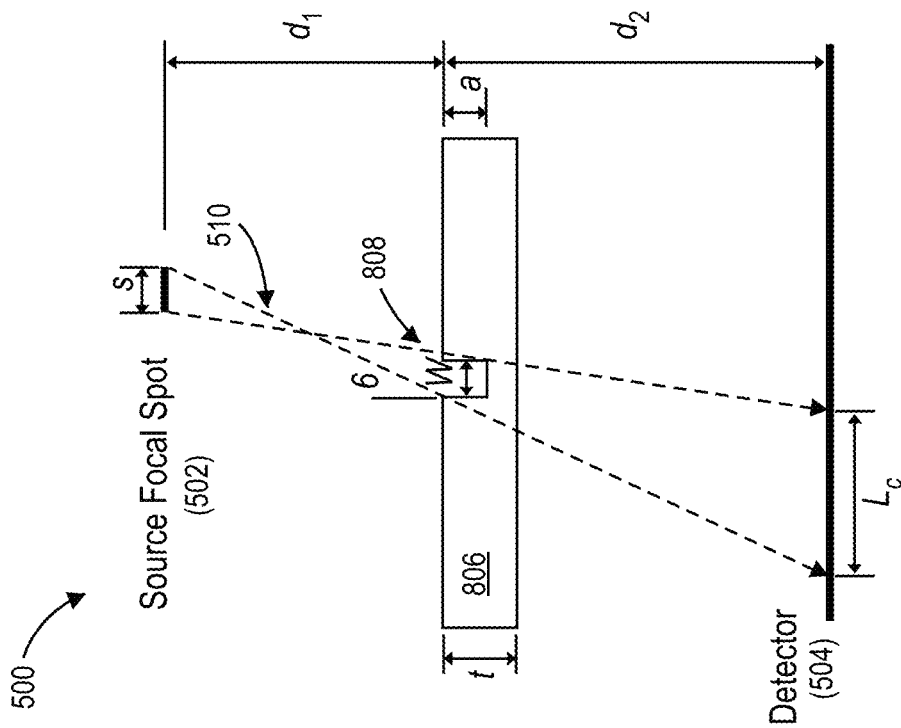
FIG. 8 illustrates a side view of the radiographic system in the selected set-up inspecting a component part to detect one or more cracks or flaws therein, according to an embodiment.

The method 100 may also include inspecting a component part using the qualified radiographic inspection system in the selected set-up, as at 170. This may be done to detect one or more cracks or flaws with greater than or equal to the predetermined target flaw size. FIG. 8 illustrates a side view of the radiographic system 500 in the selected set-up, according to an embodiment. In the selected set-up, the component part 806 may be positioned between the radiation source 502 and the detector 504. During the inspection, the radiation source 502 transmits radiation rays 510 that pass through the component part 806 to the detector 504, which records a detected image. The detected image(s) may correspond to characteristics of the component part 806 including any cracks or flaws 808 therein. If the cracks or flaws 808 are detected in the component part 806, the component part 806 may be repaired or discarded.

Figure 9:
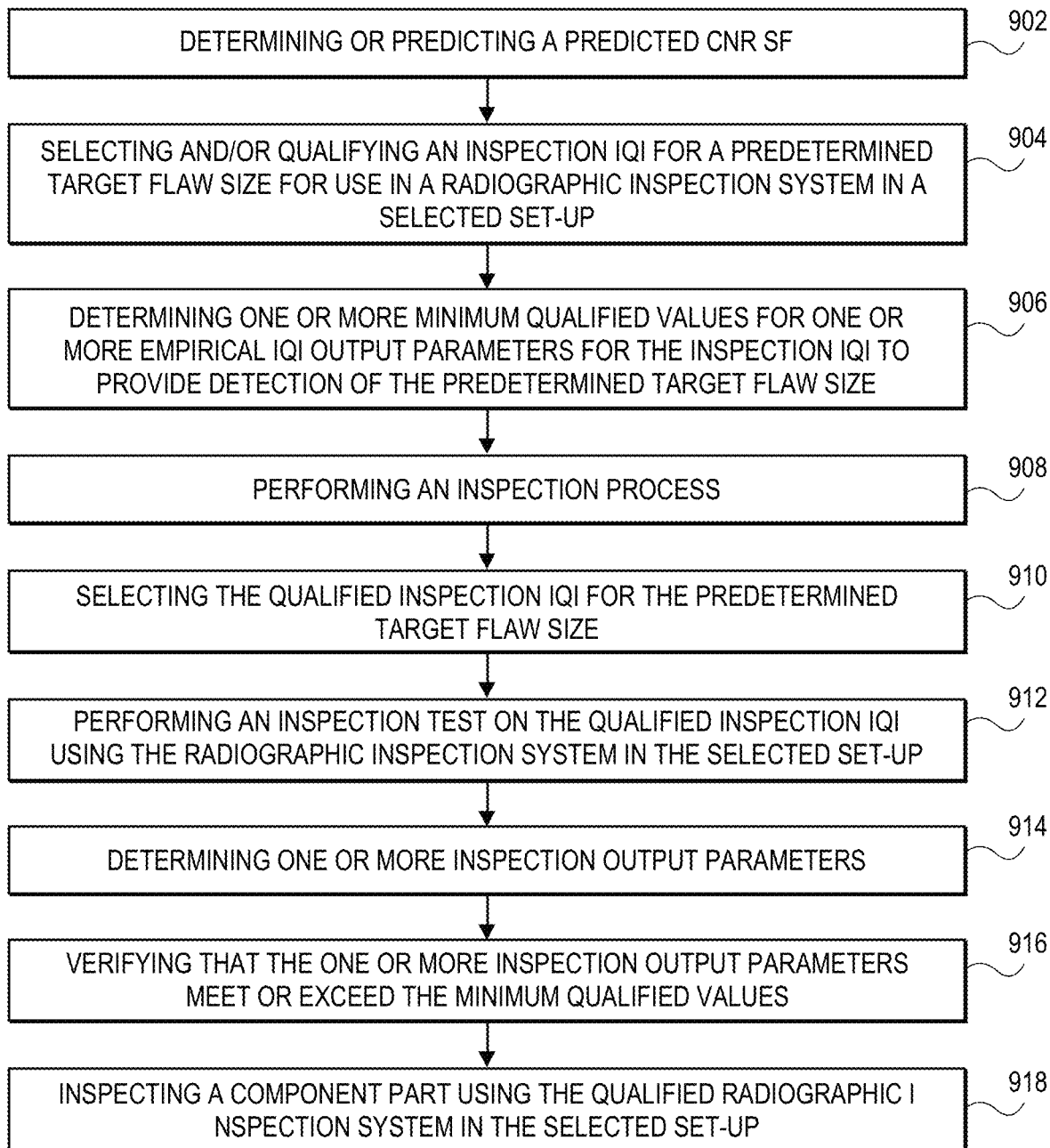
FIG. 9 illustrates a flowchart of another method for qualifying a radiographic inspection system in a selected set-up to make a crack detectability determination, according to an embodiment.

FIG. 9 illustrates a flowchart of another method 900 for qualifying a radiographic inspection system in a selected set-up to make a crack detectability determination, according to an embodiment. An illustrative order of the method 900 is provided below; however, one or more steps of the method 900 may be performed in a different order, split into sub-steps, combined, repeated, or omitted.

The method 900 may include determining or predicting a predicted CNR SF, as at 902. The predicted CNR SF may be used for crack detection. The predicted CNR SF may be based upon a plurality of correlations.

The method 900 may also include selecting and/or qualifying an inspection IQI for a predetermined target flaw size for use in the radiographic inspection system in the selected set-up, as at 904. The inspection IQI refers to a device with a target size real crack or a selected size artificial crack with known dimensions and controlled morphology. It may be made using a controlled fatigue crack growth process, electro-discharge machining process, laser machining process, or any other process that yields the desired morphology flaw. The width of the IQI flaw may be the same or larger than that of the target crack to be detected. The inspection IQI may be selected and/or qualified based upon the correlations, the predicted CNR SF, or both. The predetermined target flaw size may be the same as or different than the target flaw size from step 112 above.

The method 900 may also include determining one or more minimum qualified values for the one or more empirical IQI output parameters for the inspection IQI to provide detection of the predetermined target flaw size, as at 906.

The method 100 may also include performing an inspection process, as at 908. The inspection process may include selecting the qualified inspection IQI for the predetermined target flaw size, as at 910. The inspection process may also include performing an inspection test on the qualified inspection IQI using the radiographic inspection system 500 in the selected set-up, as at 912. As mentioned above, an example of this is shown in FIG. 7.

The inspection process may also include determining one or more inspection output parameters, as at 914. The inspection output parameters may be based upon the inspection test(s). In one embodiment, the inspection output parameters may include an inspection CNR, an inspection indication aspect ratio, an inspection resolution ratio, or a combination thereof.

The inspection process may also include verifying that the one or more inspection output parameters meet or exceed (e.g., are greater than or equal to) the minimum qualified values, as at 916. This may qualify the radiographic inspection system 500 in the selected set-up.

The method 900 may also include inspecting a component part using the qualified radiographic inspection system in the selected set-up, as at 918. This may be done to detect one or more cracks or flaws with greater than or equal to the predetermined target flaw size. As mentioned above, an example of this is shown in FIG. 8.

Figure 10A:
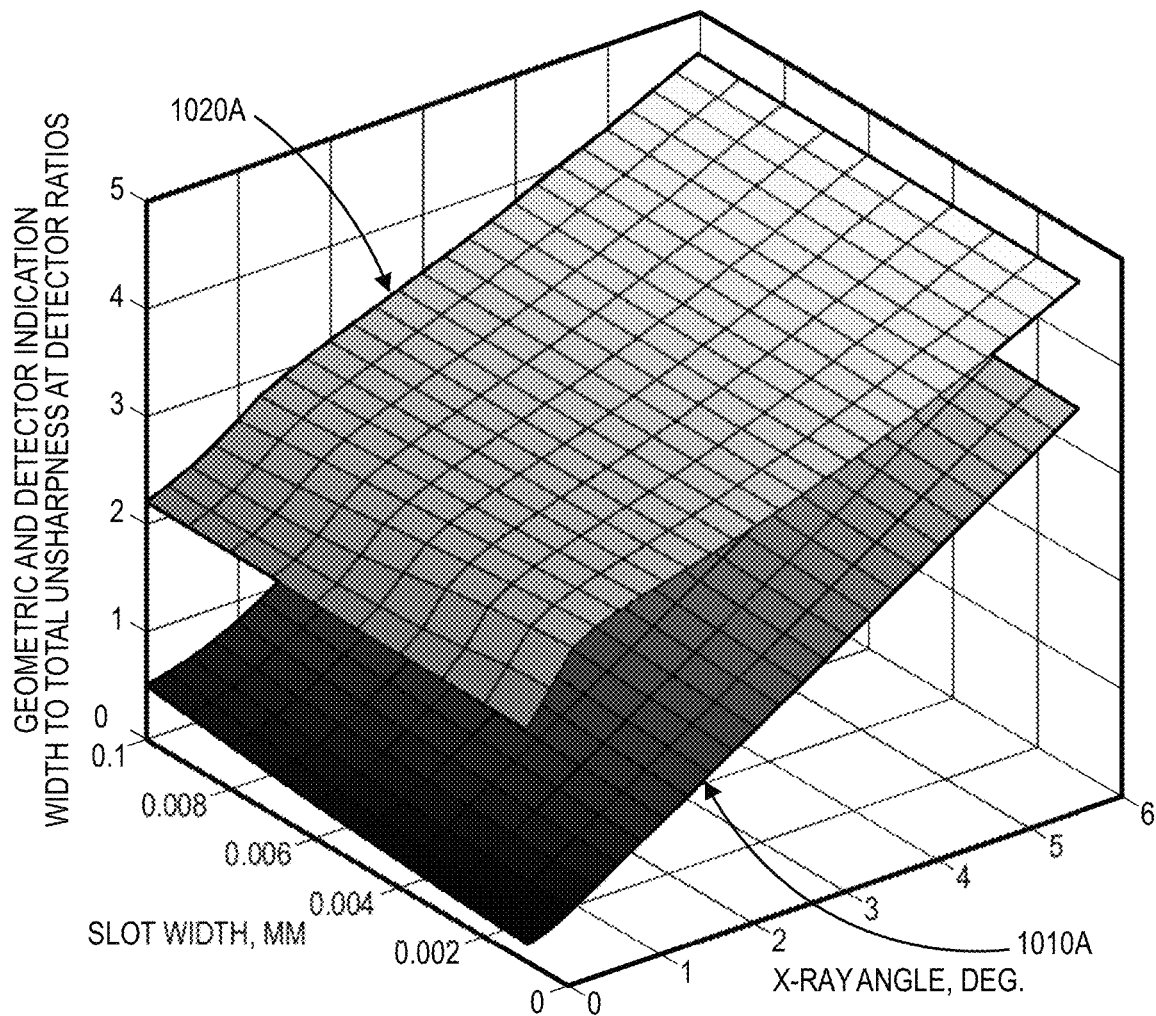
FIGS. 10A and 10B illustrate graphs showing a simulated resolution ratio and CNR maps as functions of slot width and x-ray angle, according to an embodiment.
Figure 10B:
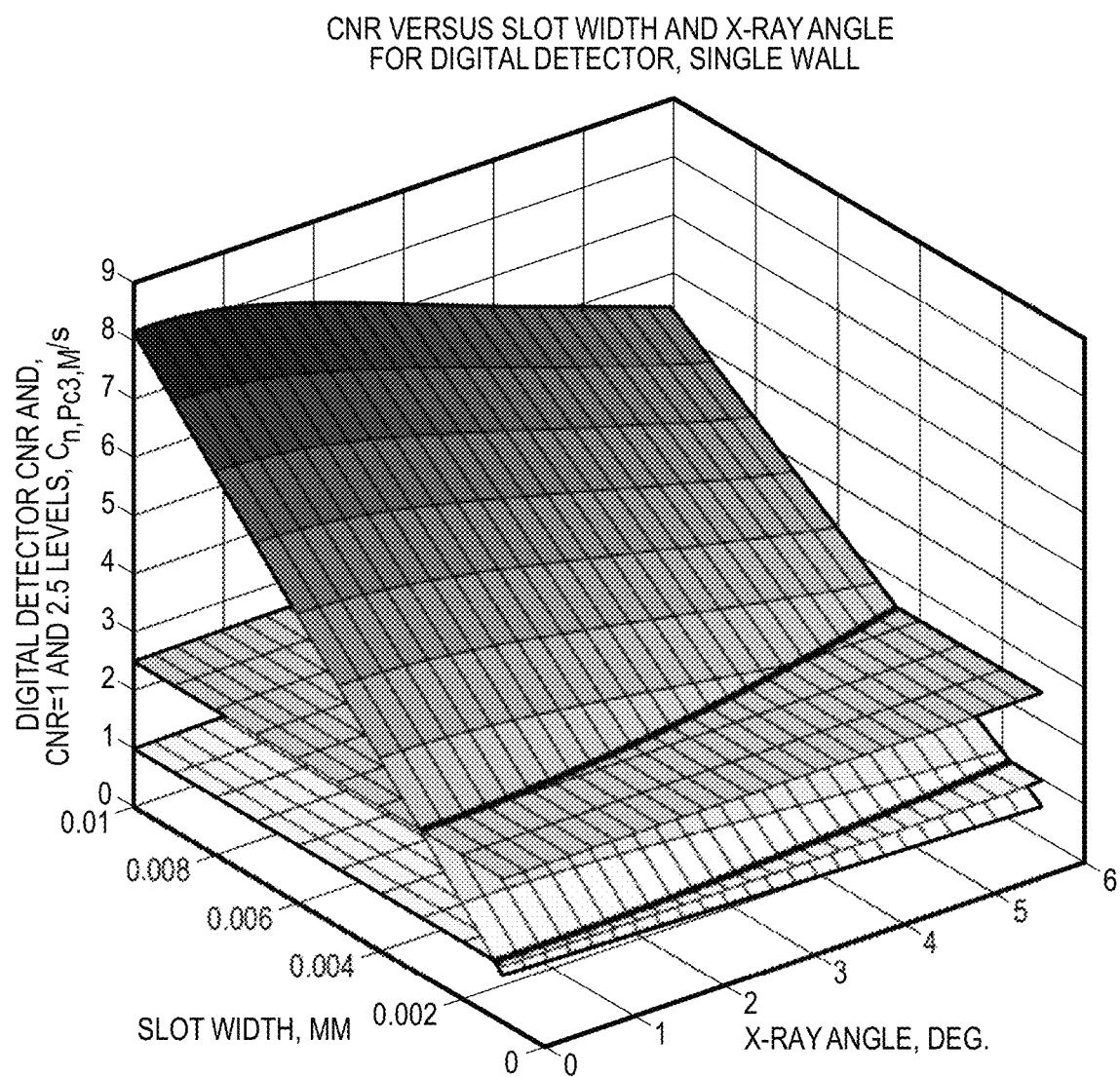

FIGS. 10A and 10B illustrate graphs showing a simulated CNR and resolution ratio maps as a function of slot width and x-ray angle, according to an embodiment. More particularly, FIG. 10A illustrates the geometric indication width ratio and the detector indication width ratio with total unsharpness at the detector. In FIG. 10A, the lower indication 1010A represents the geometric indication width ratio, and the upper indication 1020A represents the detector indication width ratio. In the example of FIG. 10A:

source size=0.400 mm
detector system basic resolution (SRb)=0.010 mm
part thickness=0.71 mm
slot depth=0.50 mm
a/t=0.71
magnification=1.01
source to part distance=600 mm FIG. 10B illustrates CNR versus slot width and x-ray angle for the detector in a single wall embodiment. In the example of FIG. 10B:

source size=0.400 mm
detector system basic resolution (SRb)=0.010 mm
thickness sensitivity Δa/t=0.040
part thickness=0.71 mm
slot depth=0.50 mm
a/t=0.71
magnification=1.01
source to part distance=600 mm In one embodiment, the calibration flaw length and/or depth may be less than or equal to the target size crack. The calibration flaw gap may be selected to be as small as practical but is likely to be larger than that of the target crack (e.g., by at least an order of magnitude). The gap size for the target crack may be known. The resolution ratios and the CNR may change monotonically as a function of the gap, as shown in FIGS. 10A and 10B, within the gap range defined by the crack gap on the low end and the calibration flaw gap on the high end.

Figure 11:
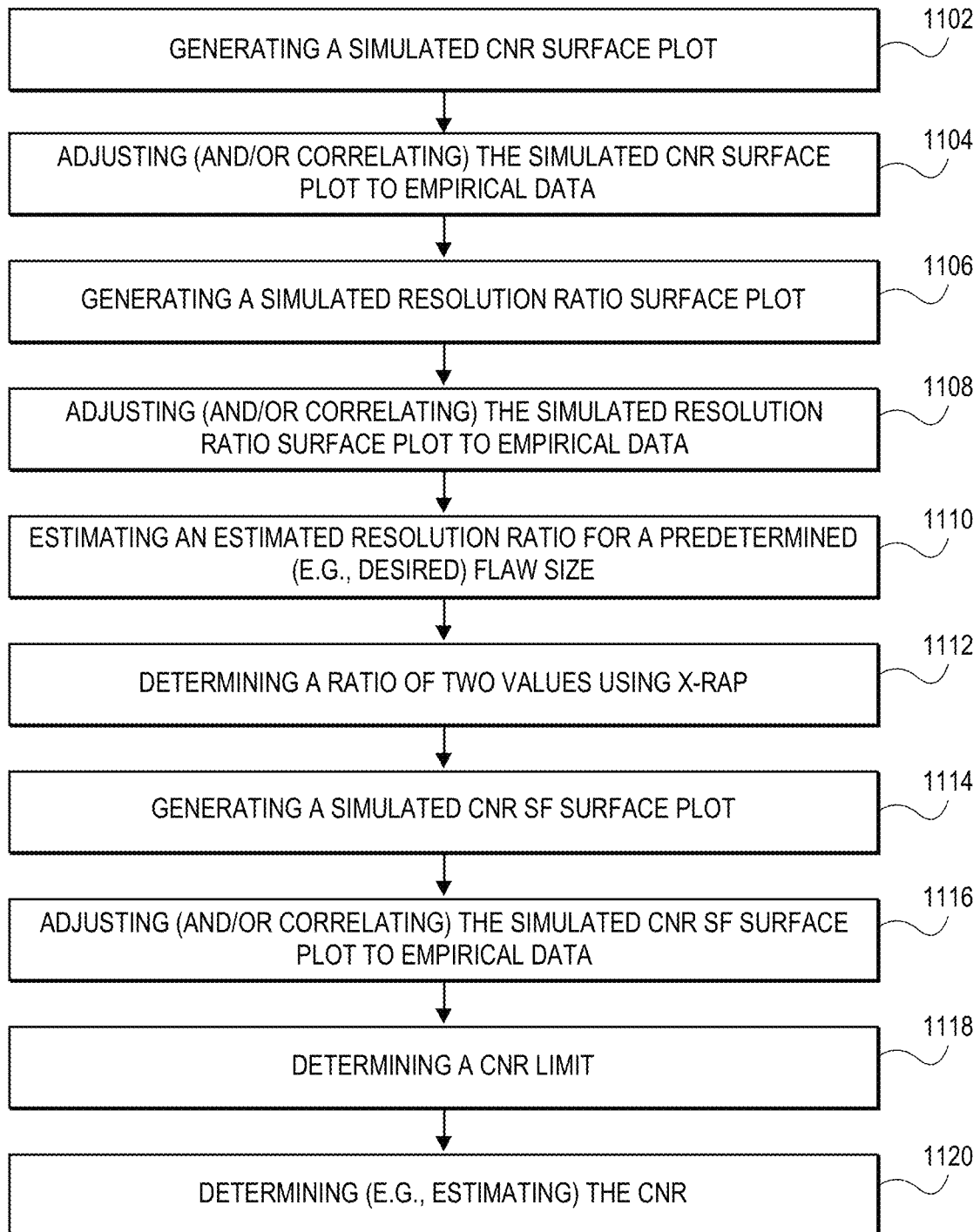
FIG. 11 illustrates a flowchart of another method for qualifying a radiographic inspection system in a selected set-up to make a crack detectability determination, according to an embodiment.

FIG. 11 illustrates a flowchart of another method 1100 for qualifying a radiographic inspection system in a selected set-up to make a crack detectability determination, according to an embodiment. An illustrative order of the method 1100 is provided below; however, one or more steps of the method 1100 may be performed in a different order, split into sub-steps, combined, repeated, or omitted.

The method 1100 may be used to qualify an x-ray detection of a cracklike target flaw. As described below, the method 1100 may include estimating the CNR and $CNR_{lim}$ for a given flaw in a given set-up. Simulation data and/or empirical data may be used. The empirical data may be taken on the same and/or close to the target size flaw as well as on the same and/or close to the calibration size flaw. The calibration size flaw may be substantially identical to the target size flaw, except the gap or width dimension for the target size flaw may be smaller than that for the calibration flaw. The steps in the method 1100 may be independently repeated for the target size flaw and/or the calibration size flaw. In the example below, resolution ratio 2 is selected, but other resolution ratios may also or instead be selected. The steps below are for the example of a target size flaw.

Figure 12A:
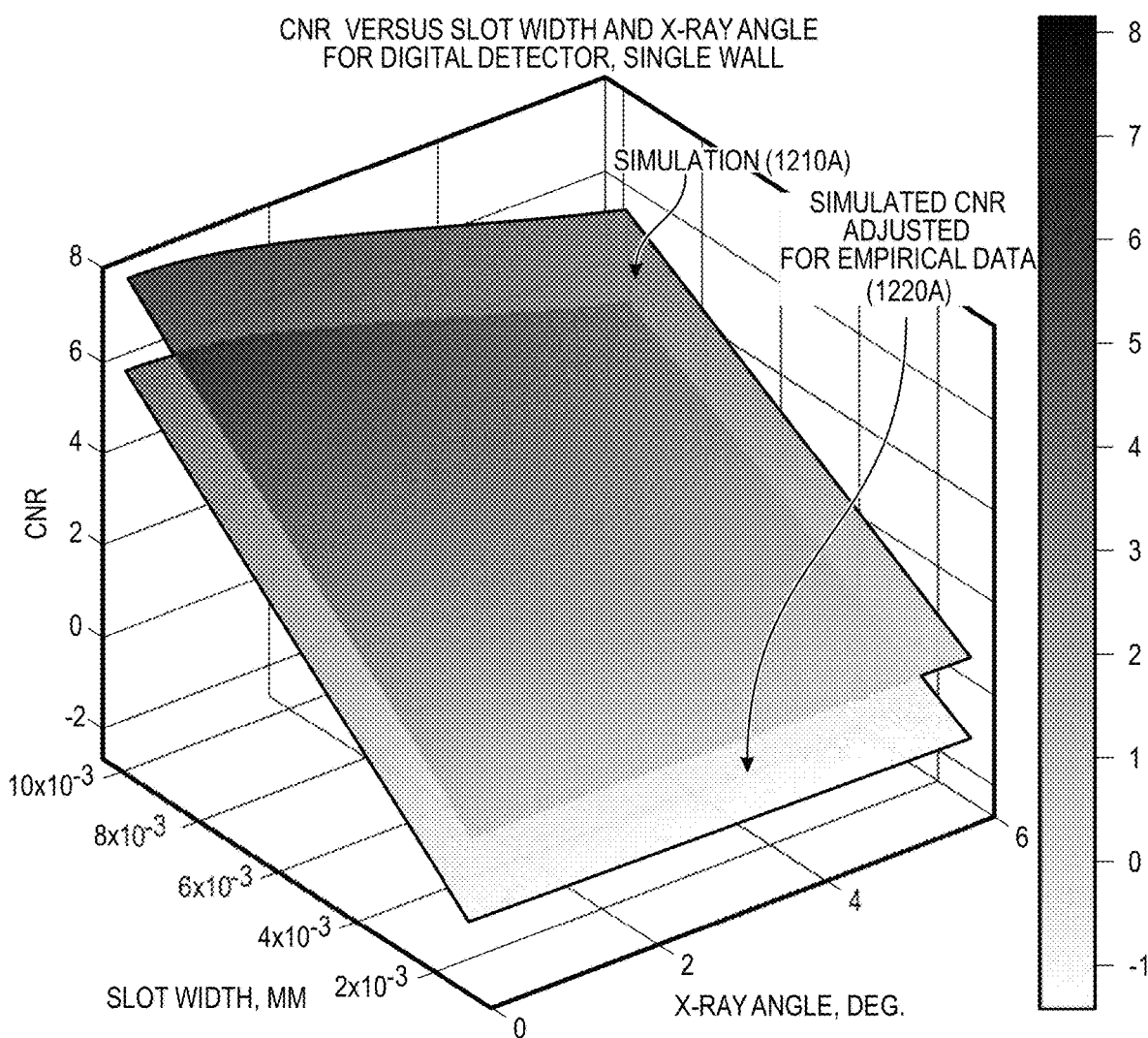
FIGS. 12A and 12B illustrate simulated CNR surface plots, according to an embodiment.
Figure 12B:
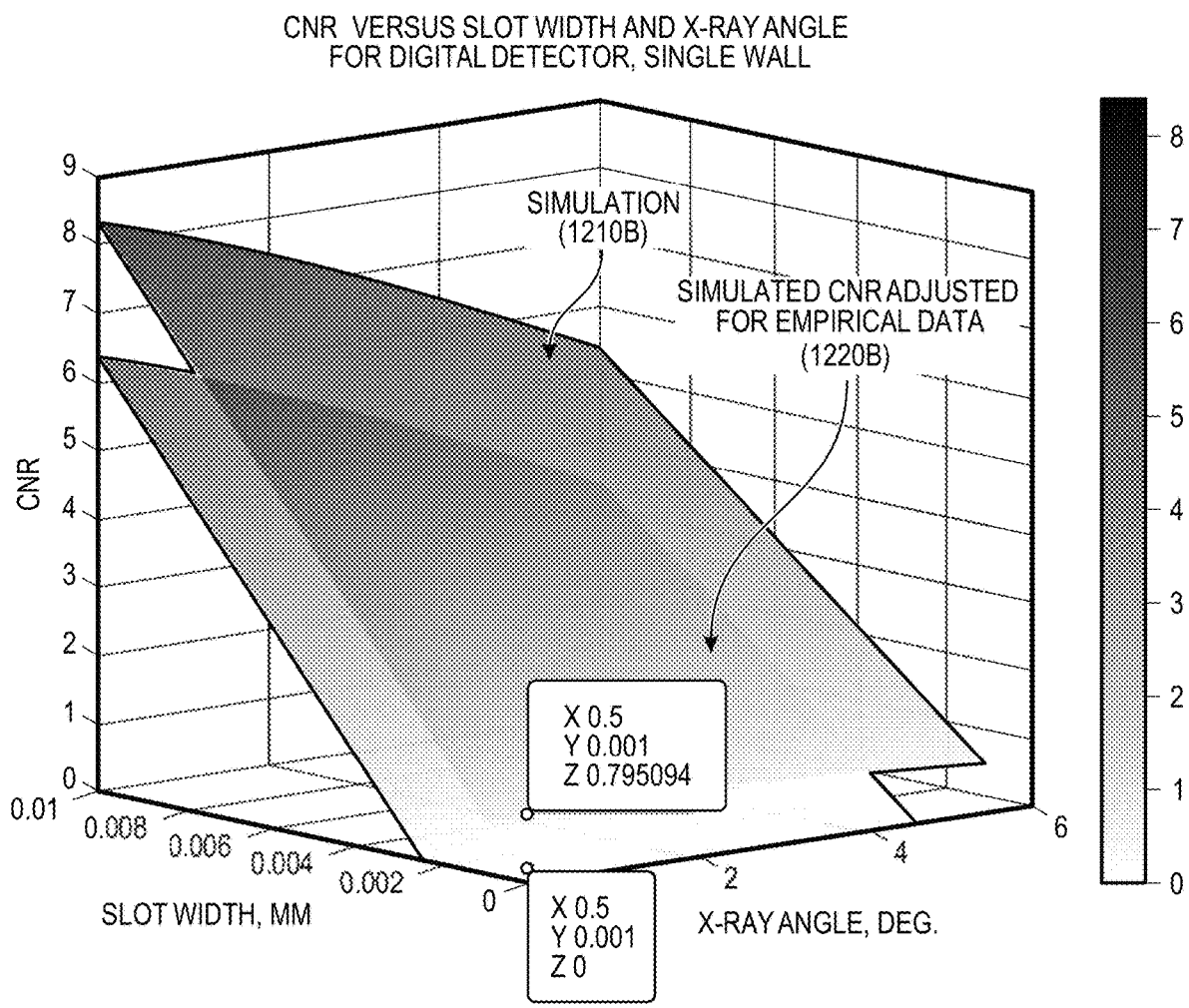

The method 1100 may include generating a simulated CNR surface plot, as at 1102. A surface equation may be determined for (e.g., fit to) the simulated CNR surface plot. The surface may have data that is applicable to the calibration size flaw. FIGS. 12A and 12B illustrate examples of CNR surface plots 1210A, 1210B, according to an embodiment.

The method 1100 may also include adjusting (and/or correlating) the simulated CNR surface plot 1210A, 1210B to empirical data, as at 1104. If a predetermined (e.g., sufficient) amount of data exists, then the empirical CNR surface plot may be generated. FIGS. 12A and 12B also illustrate examples of adjusted simulated CNR surface plots 1220A, 1220B. More particularly, FIG. 12A shows the simulated CNR surface plot 1210A adjusted for empirical data to yield 1220A, and FIG. 12B uses surface plot fitting to the simulation data to yield 1210B and surface plot fitting adjusted for empirical data to yield 1220B.

Two data points are illustrated with the same slot width and x-ray angle. The upper datapoint (plot 1210A, 1210B) is for the simulated CNR. The lower datapoint (plot 1220A, 1220B) is for the simulated CNR adjusted for empirical data. The adjustment may be done by shifting the surface so that the empirical data from the flaws close to the target size flaws are correlated.

Figure 13A:
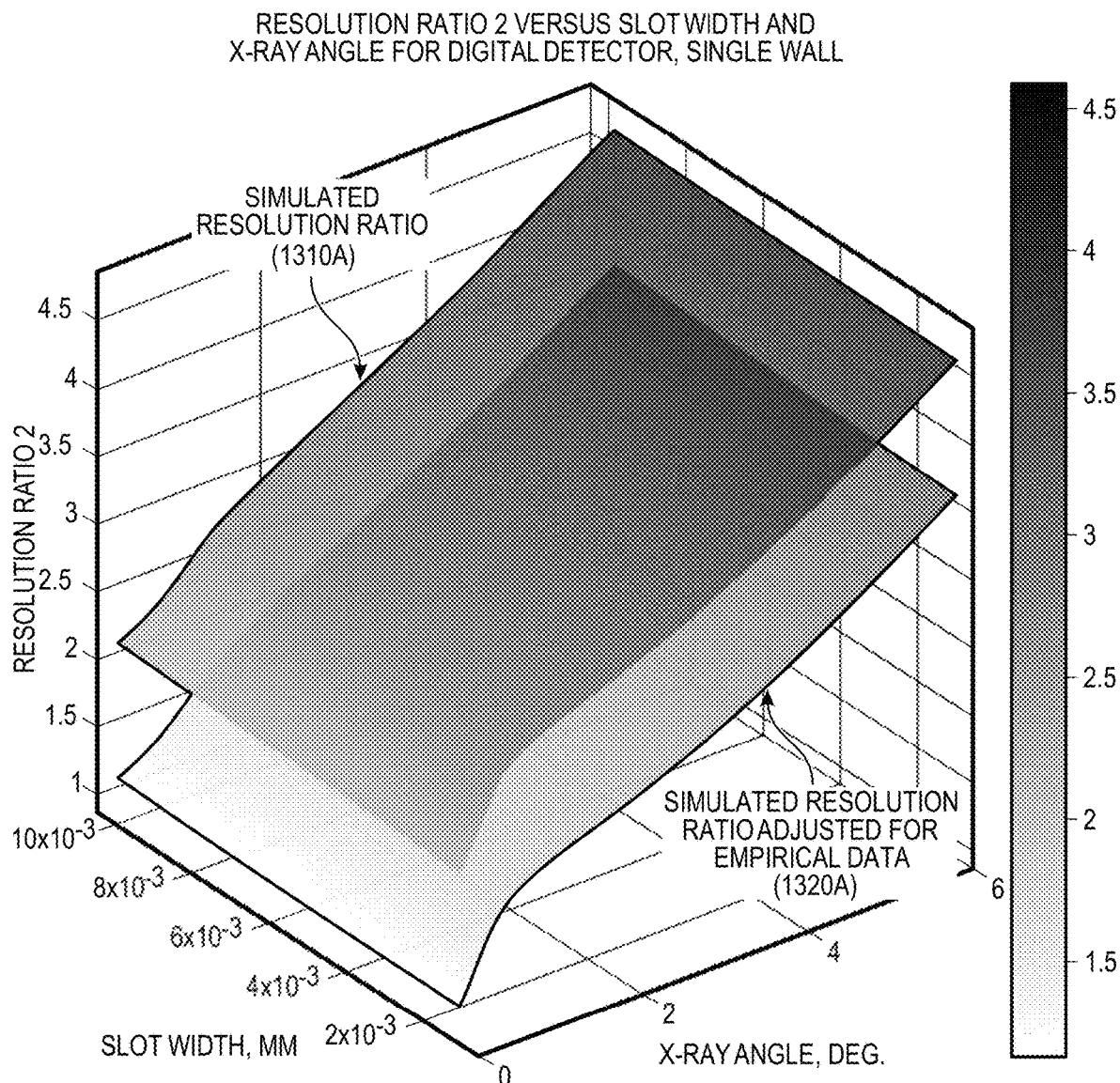
FIGS. 13A and 13B illustrate simulated resolution ratio surface plots, according to an embodiment.
Figure 13B:
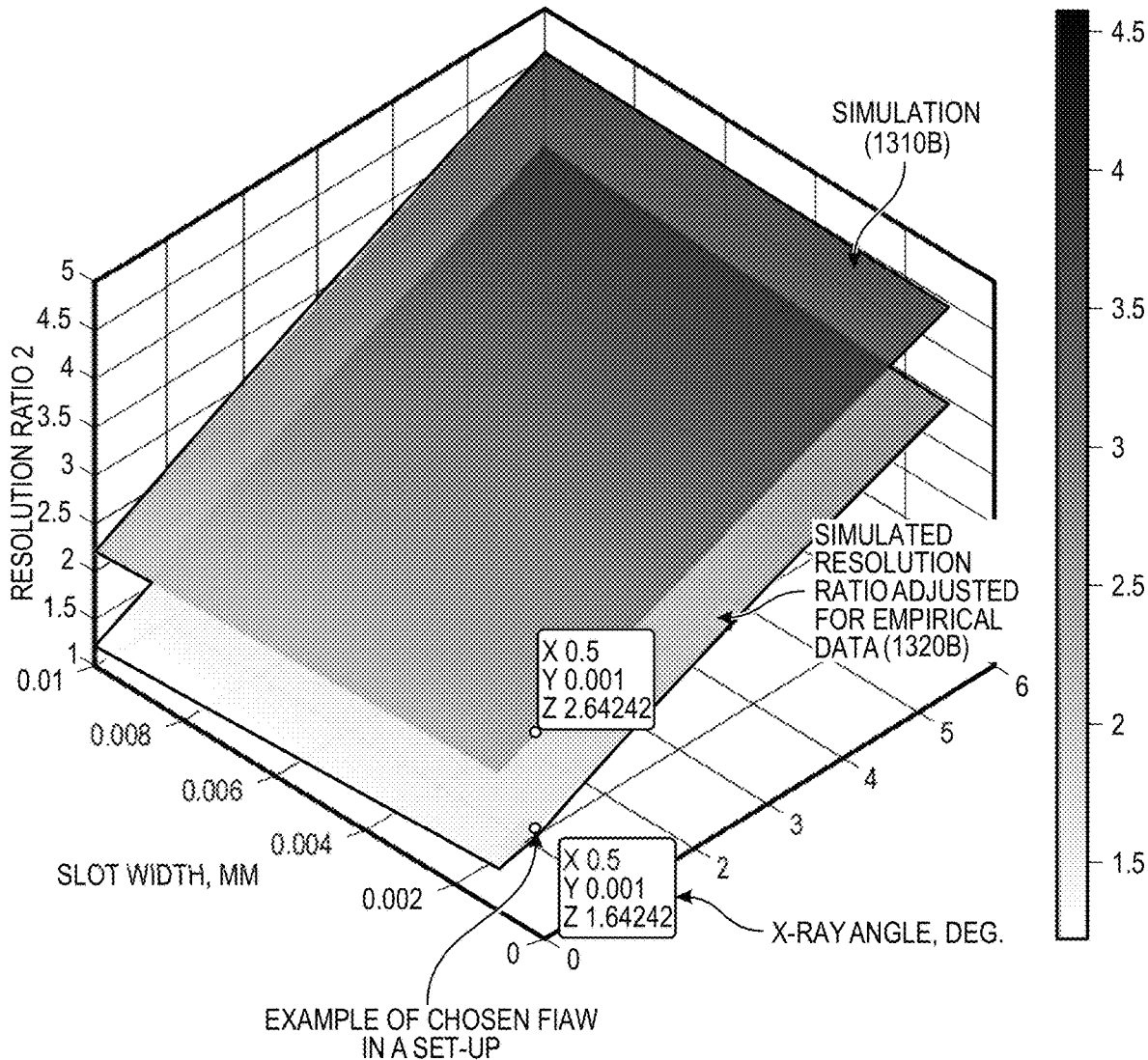

The method 1100 may also include generating a simulated resolution ratio surface plot, as at 1106. A surface equation may be fit to the simulated resolution ratio surface plot. FIGS. 13A and 13B illustrate simulated resolution ratio surface plots 1310A, 1310B, according to an embodiment.

The method 1100 may also include adjusting (and/or correlating) the simulated resolution ratio surface plot 1310A, 1310B to empirical data, as at 1108. If a predetermined (e.g., sufficient) amount of data exists, then the empirical resolution ratio surface plot may be generated. FIGS. 13A and 13B also illustrate examples of adjusted simulated resolution ratio surface plots 1320A, 1320B. More particularly, FIG. 13A shows the simulated resolution ratio surface plot 1310A adjusted for empirical data to yield 1320A, and FIG. 13B uses surface plot fitting to the simulation data to yield 1310B and surface plot fitting adjusted for empirical data to yield 1320B.

The method 1100 may also include estimating an estimated resolution ratio for a predetermined (e.g., desired) flaw size, as at 1110. The estimated resolution ratio may be estimated based at least partially upon the adjusted resolution ratio surface plot 1320A, 1320B. The estimated resolution ratio may be estimated using the same set-up as was used in one or more of steps 1102-1108.

The method 1100 may also include determining a ratio of two values, as at 1112. The ratio may be determined using x-ray application (X-RAP). The ratio may be determined based at least partially upon the simulation data and/or empirical data. The ratio may also be determined based at least partially upon the plots from steps 1102-1108. The first value may be a first ratio of the indication length to the indication width based upon the experimental or empirical data. The second value may be a second ratio of the indication length to the indication width based upon the simulation data. In one example, determining the ratio may include:

$$\hat{F}_{R_{\frac{L}{W}},exp,sim} = \frac{R_{L/W,exp}}{R_{L/W,sim}} \qquad \text{Equation 1}$$

Where F^ refers to a function that is estimated (e.g., not measured directly), R refers to a ratio, L refers to the indication length, W refers to the indication width, exp refers to experimental (e.g., empirical), and sim refers to simulation.

An estimated length/width ratio may also be determined using $R_{L/W,exp}$ for a selected flaw size in a set-up using:

$$R_{L/W,exp} = \hat{F}_{R_{\frac{L}{W}},exp,sim} R_{L/W,sim} \qquad \text{Equation 2}$$

Figure 14A:
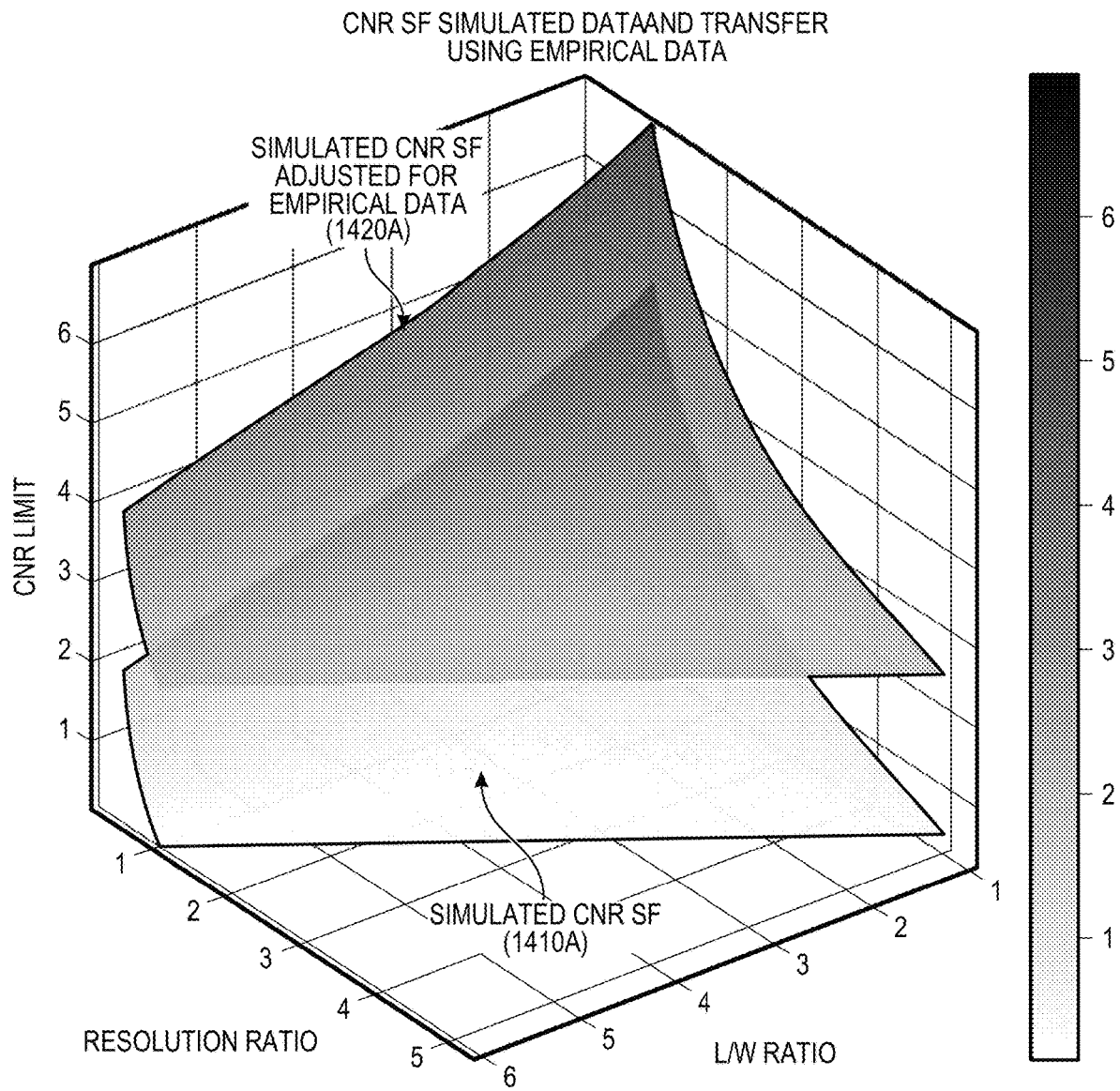
FIGS. 14A and 14B illustrate simulated CNR SF surface plots, according to an embodiment.
Figure 14B:
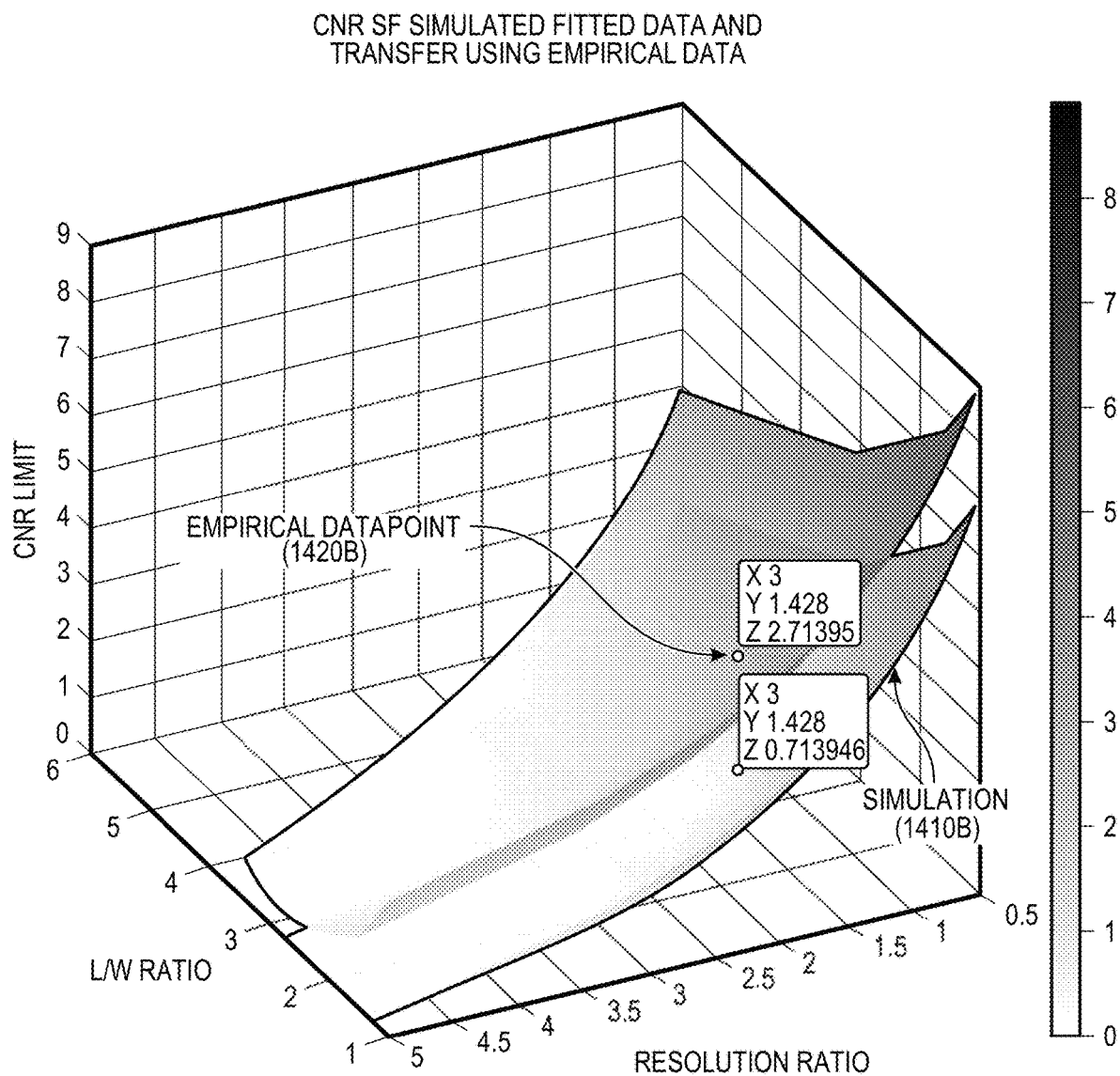

The method 1100 may also include generating a simulated CNR SF surface plot, as at 1114. A surface equation may be fit to the simulated CNR SF surface plot. FIGS. 14A and 14B illustrate simulated CNR SF surface plots 1410A, 1410B, according to an embodiment.

The method 1100 may also include adjusting (and/or correlating) the simulated CNR SF surface plot 1410A, 1410B to empirical data, as at 1116. If a predetermined (e.g., sufficient) amount of data exists, then the empirical CNR SF surface plot may be generated. FIGS. 14A and 14B also illustrate examples of adjusted simulated CNR SF surface plots 1420A, 1420B. More particularly, FIG. 14A shows the simulated CNR SF surface plot 1410A adjusted for empirical data to yield 1420A, and FIG. 14B uses surface plot fitting to the simulation data to yield 1410B and surface plot fitting adjusted for empirical data to yield 1420B.

The method 1100 may also include determining a CNR limit (also referred to herein as $CNR_{lim}$), as at 1118. The CNR limit may be determined based at least partially upon the estimated resolution ratio (from 1110), the estimated L/W ratio (from 1112), the CNR SF adjusted for empirical data (from 1116), or a combination thereof.

The method 1100 may also include determining (e.g., estimating) the CNR based at least partially upon the CNR surface plot 1420A, 1420B adjusted for empirical data (from 1116), as at 1120. The CNR may be estimated for the specific flaws size and set-up from the plots shown in FIGS. 12A and 12B. If the CNR>$CNR_{lim}$, then the flaw will be detected.

Once a set-up is selected such that CNR>$CNR_{lim}$ with a predetermined margin, then steps 1102-1120 may be repeated for the calibration flaw. A nominal CNR value, a resolution ratio value, and a L/W ratio value may be determined based upon the calibration flaw. Then, one or more limits may be set for verifying the set-up based at least partially upon measuring the CNR, resolution ratio, and L/W ratio. Then, these values may be compared with the set limits.

What is claimed is:

1. A method for qualifying a radiographic inspection system in a selected set-up to make a crack detectability determination, the method comprising:
    performing a computer-simulated process comprising:
        selecting a simulated crack comprising a target flaw size;
        selecting a simulated crack-like flaw comprising a calibration flaw size;
        performing a first simulation test on the simulated crack and a second simulation test on the simulated crack-like flaw using a simulated radiographic system in the selected set-up;
        determining one or more simulated output parameters based upon the first and second simulation tests, wherein the one or more simulated output parameters include one or more simulated crack output parameters and one or more simulated crack-like flaw output parameters;
        determining a simulated contrast-to-noise ratio sensitivity function (CNR SF) based upon the one or more simulated output parameters; and
        determining one or more simulated transfer functions between the target flaw size and the calibration flaw size based on the CNR SF;
    performing an empirical process comprising:
        selecting a real crack specimen comprising the target flaw size;
        selecting an empirical image quality indicator (IQI) comprising a crack-like flaw having the calibration flaw size;
        performing a first empirical test on the real crack specimen and a second empirical test on the empirical IQI using the radiographic inspection system in the selected set-up;
        determining one or more empirical output parameters based upon the first and second empirical tests, wherein the one or more empirical output parameters include one or more real crack specimen output parameters and one or more empirical IQI output parameters;
        determining an empirical CNR SF based upon the one or more empirical output parameters; and
        determining one or more empirical transfer functions between the target flaw size and the calibration flaw size based on the empirical CNR SF;
    determining a plurality of correlations based upon the simulated CNR SF and the empirical CNR SF;
    determining a predicted CNR SF for crack detection based upon the plurality of correlations;
    selecting and qualifying an inspection IQI for a predetermined target flaw size for use in the radiographic inspection system in the selected set-up based upon the plurality of correlations and the predicted CNR SF;
    determining minimum qualified values for the one or more empirical IQI output parameters for the inspection IQI to provide detection of the predetermined target flaw size;
    performing an inspection process comprising:
        selecting the qualified inspection IQI for the predetermined target flaw size;
        performing an inspection test on the qualified inspection IQI using the radiographic inspection system in the selected set-up;
        determining one or more inspection output parameters; and
        verifying that the one or more inspection output parameters meet or exceed the minimum qualified values to qualify the radiographic inspection system in the selected set-up; and
    inspecting a component part using the qualified radiographic inspection system in the selected set-up to detect one or more cracks with greater than or equal to the predetermined target flaw size.

2. The method of claim 1, wherein the first and second simulation tests further comprises:
   determining a simulated probability of detection (POD) based upon the one or more simulated output parameters; and
   determining a simulated probability of probability of false positive (POF) based upon the one or more simulated output parameters, wherein the simulated CNR SF is based upon the simulated POD, the simulated POF, or both.

3. The method of claim 1, wherein the one or more simulated output parameters, the one or more empirical output parameters, the one or more inspection output parameter, or a combination thereof comprise a CNR, an indication aspect ratio, and a resolution ratio.

4. The method of claim 1, wherein the plurality of correlations comprise:
   one or more first correlations between the simulated crack and the simulated crack-like flaw;
   one or more second correlations between the real crack specimen and the empirical IQI;
   one or more third correlations between the simulated crack and the real crack specimen; and
   one or more fourth correlations between the simulated crack-like flaw and the empirical IQI.

5. The method of claim 1, wherein the plurality of correlations comprises:
   a first set of correlations between a CNR of the simulated crack and a CNR of the simulated crack-like flaw, an aspect ratio of the simulated crack and an aspect ratio of the simulated crack-like flaw, and a resolution ratio of the simulated crack and a resolution ratio of the simulated crack-like flaw;
   a second set of correlations between a CNR of the real crack specimen and a CNR of the empirical IQI, an aspect ratio of the real crack specimen and an aspect ratio of the empirical IQI, and a resolution ratio of the real crack specimen and a resolution ratio of the empirical IQI;
   a third set of correlations between the CNR of the simulated crack and the CNR of the real crack specimen, the aspect ratio of the simulated crack and the aspect ratio of the real crack specimen, and the resolution ratio of the simulated crack and the resolution ratio of the real crack specimen; and
   a fourth set of correlations between the CNR of the simulated crack-like flaw and the CNR of the empirical IQI, the aspect ratio of the simulated crack-like flaw and the aspect ratio of the empirical IQI, and the resolution ratio of the simulated crack-like flaw and the resolution ratio of the empirical IQI.

6. A method for making a crack detectability determination, the method comprising:
   performing a computer-simulated process comprising:
      selecting a simulated crack comprising a target flaw size;
      selecting a simulated crack-like flaw comprising a calibration flaw size;
      performing a first simulation test on the simulated crack and a second simulation test on the simulated crack-like flaw using a simulated radiographic system in a simulated set-up; and
      determining one or more simulated output parameters based upon the first and second simulation tests;
   performing an empirical process comprising:
      selecting a real crack specimen comprising the target flaw size;
      selecting an empirical image quality indicator (IQI) comprising a crack-like flaw having the calibration flaw size;
      performing a first empirical test on the first real crack specimen and a second empirical test on the empirical IQI using a radiographic inspection system in a selected set-up; and
      determining one or more empirical output parameters based upon the first and second empirical tests;
   determining one or more correlations based at least partially upon the one or more simulated output parameters and the one or more empirical output parameters;
   determining a predicted output parameter for crack detection based upon the one or more correlations;
   selecting an inspection IQI for a predetermined target flaw size for use in the radiographic inspection system in the selected set-up based at least partially upon the predicted output parameter;
   determining minimum qualified values for the inspection IQI to provide detection of the predetermined target flaw size; and
   performing an inspection process comprising:
      performing an inspection test on the inspection IQI using the radiographic inspection system in the selected set-up;
      determining one or more inspection output parameters based upon the inspection test; and
      verifying that the one or more inspection output parameters meet or exceed the minimum qualified values to qualify the radiographic inspection system in the selected set-up.

7. The method of claim 6, further comprising inspecting a component part using the qualified radiographic inspection system in the selected set-up to detect one or more cracks with greater than or equal to the predetermined target flaw size.

8. The method of claim 6, wherein the computer-simulated process further comprises determining a simulated contrast-to-noise ratio sensitivity function (CNR SF) based upon the one or more simulated output parameters, wherein the empirical process further comprises determining an empirical CNR SF based upon the one or more empirical output parameters, and wherein the one or more correlations are based at least partially upon the simulated CNR SF and the empirical CNR SF.

9. The method of claim 6, wherein the one or more simulated output parameters, the one or more empirical output parameters, the one or more inspection output parameter, or a combination thereof comprise a CNR, an indication aspect ratio, and a resolution ratio.

10. The method of claim 6, wherein the one or more correlations comprise:
   one or more first correlations between the simulated crack and the simulated crack-like flaw;
   one or more second correlations between the real crack specimen and the empirical IQI;
   one or more third correlations between the simulated crack and the real crack specimen; and
   one or more fourth correlations between the simulated crack-like flaw and the empirical IQI.

11. A method for qualifying a radiographic inspection system in a selected set-up to make a crack detectability determination, the method comprising:
   determining a predicted contrast-to-noise ratio sensitivity function (CNR SF) for crack detection of a predetermined target flaw size with the radiographic inspection system in the selected set-up;

qualifying an inspection image quality indicator (IQI) for the predetermined target flaw size for use in the radiographic inspection system in the selected set-up, wherein qualifying the inspection IQI comprises determining one or more minimum qualified values for one or more IQI output parameters during an IQI inspection process to provide detection of the predetermined target flaw size, wherein the minimum qualified values are based on the predicted CNR SF; and performing an inspection process comprising:
  selecting the qualified inspection IQI for the predetermined target flaw size;
  performing an inspection test on the qualified inspection IQI using the radiographic inspection system in the selected set-up;
  determining one or more inspection output parameters; and
  verifying that the one or more inspection output parameters meet or exceed the minimum qualified values to qualify the radiographic inspection system in the selected set-up.

12. The method of claim 11, further comprising:
  performing a first process to produce one or more first output parameters;
  performing a second process to produce one or more second output parameters; and
  determining one or more correlations based at least partially upon the one or more first output parameters and the one or more second output parameters, wherein the predicted CNR SF is based at least partially upon the one or more correlations.

13. The method of claim 12, wherein the one or more first output parameters, the one or more second output parameters, or both comprise a CNR, an indication aspect ratio, a resolution ratio, or a combination thereof.

14. The method of claim 12, wherein the first process comprises:
  selecting a simulated crack comprising a target flaw size;
  selecting a simulated crack-like flaw comprising a calibration flaw size; and
  performing a simulation test on the simulated crack and the simulated crack-like flaw to produce one or more simulated output parameters.

15. The method of claim 13, wherein the second process comprises:
  selecting a real crack specimen comprising a target flaw size;
  selecting an empirical image quality indicator (IQI) comprising a crack-like flaw having a calibration flaw size; and
  performing an empirical test on the first real crack specimen the empirical IQI to produce one or more empirical output parameters.

16. The method of claim 15, wherein the one or more correlations are between the simulated crack and the simulated crack-like flaw.

17. The method of claim 15, wherein the one or more correlations are between the real crack specimen and the empirical IQI.

18. The method of claim 15, wherein the one or more correlations are between the simulated crack and the real crack specimen.

19. The method of claim 15, wherein the one or more correlations are between the simulated crack-like flaw and the empirical IQI.

20. The method of claim 11, further comprising inspecting a component part using the qualified radiographic inspection system in the selected set-up to detect one or more cracks with greater than or equal to the predetermined target flaw size.

* * * * *